United States Patent
Kim et al.

(10) Patent No.: US 7,626,916 B2
(45) Date of Patent: *Dec. 1, 2009

(54) METHOD AND SYSTEM FOR CROSSTALK CANCELLATION

(75) Inventors: Andrew Joo Kim, Atlanta, GA (US); Michael G. Vrazel, Atlanta, GA (US); Sanjay Bajekal, Marietta, GA (US); Charles Summers, Woodstock, GA (US)

(73) Assignee: Quellan, Inc., Atlanta, GA (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/334,864

(22) Filed: Jan. 19, 2006

(65) Prior Publication Data

US 2006/0159002 A1 Jul. 20, 2006

Related U.S. Application Data

(63) Continuation of application No. 10/911,915, filed on Aug. 5, 2004, now Pat. No. 7,050,388.

(60) Provisional application No. 60/494,072, filed on Aug. 7, 2003.

(51) Int. Cl.
 H04L 12/26 (2006.01)
(52) U.S. Cl. ........................ 370/201; 370/286
(58) Field of Classification Search .............. 370/201, 370/286
 See application file for complete search history.

(56) References Cited

U.S. PATENT DOCUMENTS 2,632,058 A  3/1953  Gray ..................... 178/15
3,445,771 A  5/1969  Clapham et al. ............... 325/42
3,571,725 A  3/1971  Kaneko et al. ................ 328/14
3,599,122 A  8/1971  Leuthoki ...................... 333/29
3,633,108 A  1/1972  Kneuer ....................... 325/323

(Continued)

FOREIGN PATENT DOCUMENTS

| EP | 0 527 966 B1 | 9/1994 |
|---|---|---|
| EP | 0 584 865 B1 | 3/2000 |
| GB | 2 223 369 A | 4/1990 |
| GB | 2 306 066 A | 4/1997 |
| JP | 62082659 | 10/1988 |

(Continued)

OTHER PUBLICATIONS

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

(Continued)

*Primary Examiner*—Melvin Marcelo
(74) *Attorney, Agent, or Firm*—King & Spalding

(57) ABSTRACT

Signals propagating in one communication channel can generate crosstalk interference in another communication channel. A crosstalk cancellation device can process the signals causing the crosstalk interference and generate a crosstalk cancellation signal that can compensate for the crosstalk when applied to the channel receiving crosstalk interference. The crosstalk cancellation device can include a model of the crosstalk effect that generates a signal emulating the actual crosstalk both in form an in timing. The crosstalk cancellation device can include a controller that monitors crosstalk-compensated communication signals and adjusts the model to enhance crosstalk cancellation performance. The crosstalk cancellation device can have a mode of self configuration or calibration in which defined test signals can be transmitted on the crosstalk-generating channel and the crosstalk-receiving channel.

20 Claims, 10 Drawing Sheets

U.S. PATENT DOCUMENTS

| | | | |
|---|---|---|---|
| 3,714,437 A | 1/1973 | Kinsel | 359/185 |
| 3,806,915 A | 4/1974 | Higgins et al. | 340/347 |
| 3,977,795 A | 8/1976 | Buschmann | 356/256 |
| 4,201,909 A | 5/1980 | Dogliotti et al. | 455/608 |
| 4,287,756 A | 9/1981 | Gallagher | 73/61.1 R |
| 4,288,872 A | 9/1981 | Tamburelli | 375/14 |
| 4,349,914 A | 9/1982 | Evans | 375/40 |
| 4,363,127 A | 12/1982 | Evans et al. | 375/30 |
| 4,386,339 A | 5/1983 | Henry et al. | 340/347 |
| 4,387,461 A | 6/1983 | Evans | 371/5 |
| 4,393,499 A | 7/1983 | Evans | 371/5 |
| 4,410,878 A | 10/1983 | Stach | 340/347 DD |
| 4,464,771 A | 8/1984 | Sorensen | 375/120 |
| 4,470,126 A | 9/1984 | Haque | 364/825 |
| 4,475,227 A | 10/1984 | Belfield | 381/30 |
| 4,479,266 A | 10/1984 | Eumurian et al. | 455/608 |
| 4,521,883 A | 6/1985 | Roché | 370/100 |
| 4,580,263 A | 4/1986 | Watanabe et al. | 371/5 |
| 4,584,720 A | 4/1986 | Garrett | 455/608 |
| 4,618,941 A | 10/1986 | Linder et al. | 364/724 |
| 4,646,173 A | 2/1987 | Kammeyer et al. | 360/51 |
| 4,651,026 A | 3/1987 | Serfaty et al. | 307/269 |
| 4,751,497 A | 6/1988 | Torii | 340/347 |
| 4,830,493 A | 5/1989 | Giebeler | 356/328 |
| 4,847,521 A | 7/1989 | Huignard et al. | 307/425 |
| 4,864,590 A | 9/1989 | Arnon et al. | 375/14 |
| 4,873,700 A | 10/1989 | Wong | 375/76 |
| 4,912,726 A | 3/1990 | Iwamatsu et al. | 375/20 |
| 4,942,593 A | 7/1990 | Whiteside et al. | 375/118 |
| 4,953,041 A | 8/1990 | Huber | 360/46 |
| 4,959,535 A | 9/1990 | Garrett | 250/214 R |
| 4,978,957 A | 12/1990 | Hotta et al. | 341/156 |
| 5,007,106 A | 4/1991 | Kahn et al. | 455/619 |
| 5,008,957 A | 4/1991 | Klyono | 455/618 |
| 5,012,475 A | 4/1991 | Campbell | 372/29 |
| 5,067,126 A | 11/1991 | Moore | 370/112 |
| 5,072,221 A | 12/1991 | Schmidt | 341/159 |
| 5,111,065 A | 5/1992 | Roberge | 307/270 |
| 5,113,278 A | 5/1992 | Degura et al. | 359/154 |
| 5,115,450 A | 5/1992 | Arcuri | 375/7 |
| 5,121,411 A | 6/1992 | Fluharty | 375/20 |
| 5,128,790 A | 7/1992 | Heidemann et al. | 359/132 |
| 5,132,639 A | 7/1992 | Blauvelt et al. | 330/149 |
| 5,151,698 A | 9/1992 | Pophillat | 341/52 |
| 5,181,034 A | 1/1993 | Takakura et al. | 341/144 |
| 5,181,136 A | 1/1993 | Kavehrad et al. | 359/190 |
| 5,184,131 A | 2/1993 | Ikeda | 341/165 |
| 5,208,833 A | 5/1993 | Erhart et al. | 375/20 |
| 5,222,103 A | 6/1993 | Gross | 375/54 |
| 5,223,834 A | 6/1993 | Wang et al. | 341/136 |
| 5,225,798 A | 7/1993 | Hunsinger et al. | 333/165 |
| 5,237,590 A | 8/1993 | Kazawa et al. | 375/20 |
| 5,243,613 A | 9/1993 | Gysel et al. | 372/26 |
| 5,252,930 A | 10/1993 | Blauvelt | 330/149 |
| 5,282,072 A | 1/1994 | Nazarathy et al. | 359/157 |
| 5,283,679 A | 2/1994 | Wedding | 359/154 |
| 5,291,031 A | 3/1994 | MacDonald et al. | 250/577 |
| 5,293,406 A | 3/1994 | Suzuki | 375/59 |
| 5,300,930 A | 4/1994 | Burger et al. | 341/96 |
| 5,321,543 A | 6/1994 | Huber | 359/187 |
| 5,321,710 A | 6/1994 | Cornish et al. | 372/26 |
| 5,327,279 A | 7/1994 | Farina et al. | 359/180 |
| 5,343,322 A | 8/1994 | Pirio et al. | 359/173 |
| 5,351,148 A | 9/1994 | Maeda et al. | 359/124 |
| 5,355,240 A | 10/1994 | Prigent et al. | 359/161 |
| 5,361,156 A | 11/1994 | Pidgeon | 359/161 |
| 5,371,625 A | 12/1994 | Wedding et al. | 319/173 |
| 5,373,384 A | 12/1994 | Hebert | 359/161 |
| 5,376,786 A | 12/1994 | MacDonald | 250/227.12 |
| 5,382,955 A | 1/1995 | Knierim | 341/64 |
| 5,387,887 A | 2/1995 | Zimmerman et al. | 333/166 |
| 5,408,485 A | 4/1995 | Ries | 372/38 |
| 5,413,047 A | 5/1995 | Evans et al. | 102/302 |
| 5,416,628 A | 5/1995 | Betti et al. | 359/181 |
| 5,418,637 A | 5/1995 | Kuo | 359/161 |
| 5,424,680 A | 6/1995 | Nazarathy et al. | 330/149 |
| 5,428,643 A | 6/1995 | Razzell | 375/308 |
| 5,428,831 A | 6/1995 | Monzello et al. | 455/296 |
| 5,436,752 A | 7/1995 | Wedding | 359/195 |
| 5,436,756 A | 7/1995 | Knox et al. | 359/260 |
| 5,444,864 A | 8/1995 | Smith | 455/84 |
| 5,450,044 A | 9/1995 | Hulick | 332/103 |
| 5,481,389 A | 1/1996 | Pidgeon et al. | 359/161 |
| 5,481,568 A | 1/1996 | Yada | 375/340 |
| 5,483,552 A | 1/1996 | Shimazaki et al. | 375/233 |
| 5,504,633 A | 4/1996 | Van Den Enden | 360/65 |
| 5,510,919 A | 4/1996 | Wedding | 359/115 |
| 5,515,196 A | 5/1996 | Kitajima et al. | 359/180 |
| 5,528,710 A | 6/1996 | Burton et al. | 385/16 |
| 5,541,955 A | 7/1996 | Jacobsmeyer | 375/222 |
| 5,548,253 A | 8/1996 | Durrant | 332/103 |
| 5,557,439 A | 9/1996 | Alexander et al. | 359/130 |
| 5,574,743 A | 11/1996 | van der Poel et al. | 372/46 |
| 5,574,978 A | 11/1996 | Talwar et al. | |
| 5,589,786 A | 12/1996 | Bella et al. | 327/108 |
| 5,604,724 A | 2/1997 | Shiokawa | |
| 5,606,734 A | 2/1997 | Bahu | 455/303 |
| 5,612,653 A | 3/1997 | Dodds et al. | 333/124 |
| 5,617,135 A | 4/1997 | Noda et al. | 348/12 |
| 5,621,764 A | 4/1997 | Ushirokawa et al. | 375/317 |
| 5,625,360 A | 4/1997 | Garrity et al. | 341/144 |
| 5,625,722 A | 4/1997 | Froberg et al. | 385/1 |
| 5,644,325 A | 7/1997 | King et al. | 345/20 |
| 5,648,987 A | 7/1997 | Yang et al. | 375/232 |
| 5,670,871 A | 9/1997 | Man et al. | 324/96 |
| 5,675,600 A | 10/1997 | Yamamoto | 372/38 |
| 5,678,198 A | 10/1997 | Lemson | 455/67.1 |
| 5,689,356 A | 11/1997 | Rainal | 359/181 |
| 5,691,978 A | 11/1997 | Kenworthy | 370/278 |
| 5,692,011 A | 11/1997 | Nobakht et al. | 375/233 |
| 5,699,022 A | 12/1997 | Tovar | 333/18 |
| 5,706,008 A | 1/1998 | Huntley, Jr. et al. | 341/156 |
| 5,721,315 A | 2/1998 | Evans et al. | 525/74 |
| 5,723,176 A | 3/1998 | Keyworth et al. | 427/163.2 |
| 5,751,726 A | 5/1998 | Kim | 371/6 |
| 5,754,681 A | 5/1998 | Watanabe et al. | 382/159 |
| 5,757,763 A | 5/1998 | Green et al. | 369/275.3 |
| 5,761,243 A | 6/1998 | Russell et al. | 375/233 |
| 5,764,542 A | 6/1998 | Gaudette et al. | 364/574 |
| 5,774,505 A | 6/1998 | Baugh | 375/348 |
| 5,783,630 A | 7/1998 | Evans et al. | 525/74 |
| 5,784,032 A | 7/1998 | Johnston et al. | 343/702 |
| 5,790,595 A | 8/1998 | Benthin et al. | 375/224 |
| 5,798,854 A | 8/1998 | Blauvelt et al. | 359/161 |
| 5,801,657 A | 9/1998 | Fowler et al. | 341/155 |
| 5,802,089 A | 9/1998 | Link | 372/38 |
| 5,812,578 A | 9/1998 | Schemmann et al. | 372/46 |
| 5,825,211 A | 10/1998 | Smith et al. | 327/19 |
| 5,825,257 A | 10/1998 | Klymyshyn et al. | 332/100 |
| 5,825,825 A | 10/1998 | Altmann et al. | 375/293 |
| 5,828,329 A | 10/1998 | Burns | 341/155 |
| 5,835,848 A | 11/1998 | Bi et al. | 455/24 |
| 5,839,105 A | 11/1998 | Ostendorf et al. | 704/256 |
| 5,841,841 A | 11/1998 | Dodds et al. | 379/93.08 |
| 5,844,436 A | 12/1998 | Altmann | 327/156 |
| 5,848,139 A | 12/1998 | Grover | 379/114 |
| 5,850,409 A | 12/1998 | Link | 372/38 |
| 5,850,505 A | 12/1998 | Grover et al. | 395/182.02 |
| 5,852,389 A | 12/1998 | Kumar et al. | 332/103 |
| 5,859,862 A | 1/1999 | Hikasa et al. | 372/38 |
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |

| Patent No. | Date | Inventor | Class |
|---|---|---|---|
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |
| 5,978,417 A | 11/1999 | Baker et al. | 375/232 |
| 5,983,178 A | 11/1999 | Naito et al. | 704/245 |
| 5,985,999 A | 11/1999 | Dominguez et al. | 525/74 |
| 5,995,565 A | 11/1999 | Tong et al. | 375/346 |
| 5,999,300 A | 12/1999 | Davies et al. | 359/183 |
| 6,002,274 A | 12/1999 | Smith et al. | 327/19 |
| 6,002,717 A | 12/1999 | Gaudet | 375/232 |
| 6,009,424 A | 12/1999 | Lepage et al. | 707/6 |
| 6,011,952 A | 1/2000 | Dankberg et al. | 455/24 |
| 6,021,110 A | 2/2000 | McGibney | 370/208 |
| 6,028,658 A | 2/2000 | Hamada et al. | 352/129 |
| 6,031,048 A | 2/2000 | Evans et al. | 525/73 |
| 6,031,866 A | 2/2000 | Oler et al. | 375/219 |
| 6,031,874 A | 2/2000 | Chennakeshu et al. | 375/262 |
| 6,034,996 A | 3/2000 | Herzberg | 375/265 |
| 6,035,080 A | 3/2000 | Henry et al. | 385/24 |
| 6,041,299 A | 3/2000 | Schuster et al. | 704/232 |
| 6,052,420 A | 4/2000 | Yeap et al. | 375/346 |
| 6,072,364 A | 6/2000 | Jeckeln et al. | 330/149 |
| 6,072,615 A | 6/2000 | Mamyshev | 359/183 |
| 6,078,627 A | 6/2000 | Crayford | 375/286 |
| 6,084,931 A | 7/2000 | Powell, II et al. | 375/355 |
| 6,091,782 A | 7/2000 | Harano | 375/287 |
| 6,093,496 A | 7/2000 | Dominguez et al. | 428/500 |
| 6,093,773 A | 7/2000 | Evans et al. | 525/73 |
| 6,108,474 A | 8/2000 | Eggleton et al. | 385/122 |
| 6,111,477 A | 8/2000 | Klymyshyn et al. | 333/139 |
| 6,118,563 A | 9/2000 | Boskovic et al. | 359/124 |
| 6,118,567 A | 9/2000 | Alameh et al. | 359/189 |
| 6,127,480 A | 10/2000 | Dominguez et al. | 525/74 |
| 6,140,416 A | 10/2000 | Evans et al. | 525/74 |
| 6,140,858 A | 10/2000 | Dumont | 327/317 |
| 6,140,972 A | 10/2000 | Johnston et al. | 343/725 |
| 6,141,127 A | 10/2000 | Boivin et al. | 359/124 |
| 6,141,387 A | 10/2000 | Zhang | 375/261 |
| 6,148,428 A | 11/2000 | Welch et al. | 714/752 |
| 6,151,150 A | 11/2000 | Kikuchi | 359/194 |
| 6,154,301 A | 11/2000 | Harvey | 359/193 |
| 6,163,638 A | 12/2000 | Eggleton et al. | 385/37 |
| 6,169,764 B1 | 1/2001 | Babanezhad | 375/233 |
| 6,169,912 B1 | 1/2001 | Zuckerman | 455/570 |
| 6,181,454 B1 | 1/2001 | Nagahori et al. | 359/189 |
| 6,191,719 B1 | 2/2001 | Bult et al. | 341/144 |
| 6,201,916 B1 | 3/2001 | Eggleton et al. | 385/122 |
| 6,208,792 B1 | 3/2001 | Hwang et al. | 385/129 |
| 6,211,978 B1 | 4/2001 | Wojtunik | 359/114 |
| 6,212,654 B1 | 4/2001 | Lou et al. | 714/701 |
| 6,214,914 B1 | 4/2001 | Evans et al. | 524/323 |
| 6,215,812 B1 | 4/2001 | Young et al. | 375/144 |
| 6,219,633 B1 | 4/2001 | Lepage | 704/9 |
| 6,222,861 B1 | 4/2001 | Kuo et al. | 372/20 |
| 6,226,112 B1 | 5/2001 | Denk et al. | 359/138 |
| 6,236,963 B1 | 5/2001 | Naito et al. | 704/241 |
| 6,259,836 B1 | 7/2001 | Dodds | 385/24 |
| 6,259,847 B1 | 7/2001 | Lenz et al. | 385/131 |
| 6,268,816 B1 | 7/2001 | Bult et al. | 341/144 |
| 6,271,690 B1 | 8/2001 | Hirano et al. | 327/75 |
| 6,271,944 B1 | 8/2001 | Schemmann et al. | 359/124 |
| 6,281,824 B1 | 8/2001 | Masuda | 341/144 |
| 6,285,709 B1 | 9/2001 | Alelyunas et al. | |
| 6,288,668 B1 | 9/2001 | Tsukamoto et al. | 341/172 |
| 6,289,055 B1 | 9/2001 | Knotz | 375/286 |
| 6,289,151 B1 | 9/2001 | Kazarinov et al. | 385/32 |
| 6,295,325 B1 | 9/2001 | Farrow et al. | 375/327 |
| 6,297,678 B1 | 10/2001 | Gholami | 327/198 |
| 6,298,459 B1 | 10/2001 | Tsukamoto | 714/746 |
| 6,304,199 B1 | 10/2001 | Fang et al. | 341/118 |
| 6,311,045 B1 | 10/2001 | Domokos | 455/78 |
| 6,313,713 B1 | 11/2001 | Ho et al. | 333/1.1 |
| 6,314,147 B1 | 11/2001 | Liang et al. | 375/346 |
| 6,317,247 B1 | 11/2001 | Yang et al. | 359/245 |
| 6,317,469 B1 | 11/2001 | Herbert | 375/293 |
| 6,341,023 B1 | 1/2002 | Puc | 359/124 |
| 6,356,374 B1 | 3/2002 | Farhan | 359/180 |
| 6,388,786 B1 | 5/2002 | Ono et al. | 359/181 |
| 6,411,117 B1 | 6/2002 | Hatamian | 324/765 |
| 6,421,155 B1 | 7/2002 | Yano | 359/181 |
| 6,445,476 B1 | 9/2002 | Kahn et al. | 359/184 |
| 6,473,131 B1 | 10/2002 | Neugebauer et al. | 348/572 |
| 6,501,792 B2 | 12/2002 | Webster | 375/232 |
| 6,539,204 B1 | 3/2003 | Marsh et al. | 455/63 |
| 6,560,257 B1 | 5/2003 | DeSalvo et al. | 372/38.02 |
| 6,650,189 B1 | 11/2003 | Romao | |
| 6,665,348 B1 | 12/2003 | Feher | 375/259 |
| 6,665,500 B2 | 12/2003 | Snawerdt | 398/185 |
| 6,718,138 B1 | 4/2004 | Sugawara | 398/9 |
| 6,751,587 B2 | 6/2004 | Thyssen et al. | 704/228 |
| 6,816,101 B2 | 11/2004 | Hietala et al. | 341/155 |
| 6,819,166 B1 | 11/2004 | Choi et al. | 327/551 |
| 6,819,943 B2 | 11/2004 | Dalal | |
| 6,920,315 B1 | 7/2005 | Wilcox et al. | |
| 6,961,019 B1 | 11/2005 | McConnell et al. | 342/357.1 |
| 7,035,361 B2 | 4/2006 | Kim et al. | 375/350 |
| 7,050,388 B2 | 5/2006 | Kim et al. | 370/201 |
| 7,123,676 B2 | 10/2006 | Gebara et al. | |
| 7,149,256 B2 | 12/2006 | Vrazel et al. | |
| 7,173,551 B2 | 2/2007 | Vrazel et al. | |
| 7,212,580 B2 | 5/2007 | Hietala et al. | |
| 7,215,721 B2 | 5/2007 | Hietala et al. | |
| 7,307,569 B2 | 12/2007 | Vrazel et al. | |
| 2001/0024542 A1 | 9/2001 | Aina et al. | 385/24 |
| 2002/0086640 A1 | 7/2002 | Belcher et al. | 455/63.1 |
| 2002/0167693 A1 | 11/2002 | Vrazel et al. | |
| 2002/0196508 A1 | 12/2002 | Wei et al. | 359/183 |
| 2002/0196510 A1 | 12/2002 | Hietala et al. | |
| 2003/0002121 A1 | 1/2003 | Miyamoto et al. | |
| 2003/0007631 A1 | 1/2003 | Bolognesi et al. | |
| 2003/0008628 A1 | 1/2003 | Lindell et al. | 455/180.1 |
| 2003/0030874 A1 | 2/2003 | Takei | 359/187 |
| 2003/0053534 A1 | 3/2003 | Sivadas et al. | 375/229 |
| 2003/0058976 A1 | 3/2003 | Ohta et al. | 375/350 |
| 2003/0063354 A1 | 4/2003 | Davidson | 359/189 |
| 2003/0067990 A1 | 4/2003 | Bryant | 375/259 |
| 2004/0012433 A1 | 1/2004 | Kim et al. | |
| 2004/0053578 A1 | 3/2004 | Grabon et al. | |
| 2004/0105462 A1 | 6/2004 | Kim et al. | |
| 2004/0114888 A1 | 6/2004 | Rich et al. | |
| 2004/0197103 A1 | 10/2004 | Roberts et al. | 398/159 |
| 2004/0213354 A1 | 10/2004 | Jones et al. | 375/285 |
| 2004/0218756 A1 | 11/2004 | Tang et al. | 379/417 |
| 2005/0030884 A1 | 2/2005 | Kim et al. | |
| 2005/0069063 A1 | 3/2005 | Waltho et al. | 375/346 |
| 2005/0180520 A1 | 8/2005 | Kim et al. | |
| 2006/0146966 A1 | 7/2006 | Golanbari et al. | |
| 2006/0178157 A1 | 8/2006 | Gebara et al. | |
| 2006/0291598 A1 | 12/2006 | Gebara et al. | |
| 2007/0060059 A1 | 3/2007 | Kim et al. | |
| 2007/0064923 A1 | 3/2007 | Schmukler et al. | |
| 2007/0092265 A1 | 4/2007 | Vrazel et al. | |
| 2007/0171998 A1 | 7/2007 | Hietala et al. | |

2007/0253495 A1 11/2007 Kim

FOREIGN PATENT DOCUMENTS

| JP | 1990000063162 | | 11/1991 |
|---|---|---|---|
| JP | 04187738 | | 7/1992 |
| JP | 08079186 | A | 3/1996 |
| WO | WO 99/45683 | A1 | 9/1999 |
| WO | WO 01/41346 | A2 | 6/2001 |
| WO | WO 02/067521 | A1 | 8/2002 |
| WO | WO 02/082694 | A1 | 10/2002 |
| WO | WO 02/091600 | A2 | 11/2002 |
| WO | WO 03/071731 | A1 | 8/2003 |
| WO | WO 03/077423 | A2 | 9/2003 |
| WO | WO 03/092237 | A1 | 11/2003 |
| WO | WO 2004/008782 | A2 | 1/2004 |
| WO | WO 2004/045078 | A2 | 5/2004 |
| WO | WO 2004/088857 | A2 | 10/2004 |
| WO | WO 2005/018134 | A2 | 2/2005 |
| WO | WO 2005/050896 | A2 | 6/2005 |
| WO | WO2006/065883 | A2 | 6/2006 |

OTHER PUBLICATIONS

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15$^{th}$ Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18-μm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Downie et al.; *Performance Monitoring of Optical Networks with Synchronous and Asynchronous Sampling*; Corning Incorporated, Science and Technology; SP-AR-02-1; p. WDD50-1; Abstract.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Fürst et al.; *Performance Limits of Nonlinear RZ and NRZ Coded Transmission at 10 and 40 Gb/s on Different Fibers*; pp. 302-304.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24$^{th}$ European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12 , 2003.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 μm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec., 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. On Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lightwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Shtaif et al.; *Limits on the Spectral Efficiency of Intensity Modulated Direct Detection Systems with Optical Amplifiers*; AT&T Labs Research; pp. MM1-1-MM1-3.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Vorenkamp et al.; *A 1Gs/s, 10b Digital-to-Analog Converter*; ISSCC94/Session 3/Analog Techniques/Paper WP 3.3; pp. 52-53.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 46 km Installed Standard Singlemode Fibre*; $22^{nd}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Weger et al.; *Gilbert Multiplier as an Active Mixer with Conversion Gain Bandwidth of up to 17GHz*; Electronics Letters; Mar. 28, 1991; vol. 27, No. 7; pp. 570-571.

Westphal et al.; *Lightwave Communications*; 1994; Thursday Afternoon/CLEO '94; pp. 337-338.

Williamson et al., *Performance Analysis of Adaptive Wideband Duplexer*; 2003 Australian Telecommunications, Networks and Applications Conference (ATNAC); Dec. 8-10, 2003.

Wilson et al.; *Predistortion of Electroabsorption Modulators for Analog CATV Systems at 1.55 µm*; Journal of Lightwave Technology; vol. 15, No. 9; Sep. 1997; pp. 1654-1662.

Author: Unknown; *Digital Carrier Modulation Schemes*; Title: Unknown; Date: Unknown; pp. 380-442.

METHOD AND SYSTEM FOR CROSSTALK CANCELLATION

CROSS REFERENCE TO RELATED APPLICATIONS

This application is a continuation of and claims priority to U.S. patent application Ser. No. 10/911,915, filed Aug. 5, 2004 now U.S. Pat. No. 7,050,388 and entitled "Method and System for Crosstalk Cancellation," the entire contents of which are hereby incorporated herein by reference. U.S. patent application Ser. No. 10/911,915 claims the benefit of priority to U.S. Provisional Patent Application Ser. No. 60/494,072, entitled "Method for Crosstalk Cancellation in High-Speed Communication Systems," and filed Aug. 7, 2003. The contents of U.S. Provisional Patent Application Ser. No. 60/494,072 are hereby incorporated by reference.

This application is related to U.S. Nonprovisional patent application Ser. No. 10/108,598, entitled "Method and System for Decoding Multilevel Signals," filed on Mar. 28, 2002, and U.S. Nonprovisional patent application Ser. No. 10/620,477, entitled "Adaptive Noise Filtering and Equalization for Optimal High Speed Multilevel Signal Decoding," filed on Jul. 15, 2003. The contents of U.S. patent application Ser. No. 10/108,598 and U.S. patent application Ser. No. 10/620,477 are hereby incorporated by reference.

FIELD OF THE INVENTION

The present invention relates to the field of communications, and more specifically to improving the signal fidelity in a communication system by compensating for crosstalk interference that occurs between two or more communication channels that is prevalent at high data communication rates.

BACKGROUND

Increased consumption of communication services fuels a need for increased data carrying capacity or bandwidth in communication systems. A phenomenon known as crosstalk often occurs in these communication systems and can impair high-speed signal transmission and thus limit communication bandwidth to an undesirably low level.

Crosstalk is a condition that arises in communications systems wherein a signal in one communication channel is corrupted by interference (or bleed-over) from a different signal being communicated over another channel. The interference may arise due to a variety of effects. For example, in electrical systems such as circuit boards, electrical connectors, and twisted pair cable bundles, each electrical path serves as a channel. At high communication speeds, these conductive paths behave like antennae, both radiating and receiving electromagnetic energy. The radiated energy from one channel, referred to herein as the "aggressing channel," is undesirably coupled into or received by another channel, referred to herein as the "victim channel." This undesirable transfer of signal energy, known as "crosstalk," can compromise data integrity on the receiving channel. Crosstalk is typically bidirectional in that a single channel can both radiate energy to one or more other channels and receive energy from one or more other channels.

Crosstalk is emerging as a significant barrier to increasing throughput rates of communications systems. When not specifically addressed, crosstalk, often manifests itself as noise. In particular, crosstalk degrades signal quality by increasing uncertainty in the received signal value thereby making reliable communications more difficult, i.e. data errors occur with increased probability. In other words, crosstalk typically becomes more problematic at increased data rates. Not only does crosstalk reduce signal integrity, but additionally, the amount of crosstalk often increases with the bandwidth of the aggressing signal, thereby making higher data rate communications more difficult. This is particularly the case in electrical systems employing binary or multi-level signaling, since the conductive paths over which such signals flow radiate and receive energy more efficiently at the high frequencies associated with the level transitions in these signals. In other words, each signal in a binary or multi-level communication signal is composed of high-frequency signal components that are more susceptible to crosstalk degradation compared to lower frequency components.

The crosstalk impediment to increasing data throughput rates is further compounded by the tendency of the high-frequency content of the victim signal to attenuate heavily over long signal transmission path lengths (e.g. circuit traces that are several inches in length for multi-gigabit per second data rates). That is, high-frequency components of a communication signal not only receive a relatively high level of crosstalk interference, but also are susceptible to interference because they are often weak due to transmission losses.

While these attenuated high-frequency components can be amplified via a technique known as channel equalization, such channel equalization frequently increases noise and crosstalk as a byproduct of amplifying the high-frequency signals that carry data. The amount of crosstalk present in a communication link often limits the level of equalization that can be utilized to restore signal integrity. For example, at the multi-gigabit per second data rates desired for next-generation backplane systems, the level of crosstalk energy on a communication channel can exceed the level of victim signal energy at the high frequencies that underlie such high-speed communication. In this condition, extraneous or stray signal energy can dominate the energy of the desirable data-carrying signals, thus rendering communicating at these data rates impractical with most conventional system architectures.

The term "noise," as used herein, is distinct from crosstalk and refers to a completely random phenomenon. Crosstalk, in contrast, is a deterministic, but often unknown, parameter. The conventional art includes knowledge that it is theoretically possible to modify a system in order to mitigate crosstalk. In particular, with definitions of: (i) the data communicated over an interfering or aggressing channel; and (ii) the signal transformation that occurs in coupling from the aggressing channel to the victim channel, the crosstalk can be theoretically determined and cancelled. That is, those skilled in the art understand that crosstalk signal degradation can be cancelled if the data carried by a communication signal that is input into a communication channel is known and the signal transformation imposed on the communication signal by crosstalk is also known. However, achieving a level of definition of this signal transformation having sufficient precision and accuracy to support a practical implementation of a system that adequately cancels crosstalk is difficult with conventional technology. Consequently, conventional technology that addresses crosstalk is generally insufficient for high-speed (e.g. multi-gigabit per second) communications systems. Thus, there is a need in the art to cancel-crosstalk so as to improve victim signal fidelity and remove the barrier that crosstalk often poses to increasing data throughput rates.

While the physics giving rise to crosstalk (e.g. electromagnetic coupling in electrical systems or four-wave-mixing in optical systems) is well understood, this understanding alone does not provide direct and simple models for the crosstalk transfer function. One common reason for conventional modeling difficulties is that the relative geometries of the victim and aggressor signal paths heavily influence the transfer function of the crosstalk effect, and these paths can be quite convoluted. In other words, signal path complexity typically checks efforts to model crosstalk using conventional modeling methods based on analyzing signal conduits. Furthermore, it is generally undesirable to design a crosstalk canceller for a predetermined specific crosstalk response since: (i) a system may have many different responses for different victim-aggressor pairs (each requiring a specific design); and (ii) different systems may need different sets of designs. Thus, there is a need in the art for a crosstalk cancellation system and method with sufficient flexibility to: (i) accommodate the variety of crosstalk transfer functions that can stem from ordinary operations of a given system; and (ii) self-calibrate in order to avoid a complex manual task of characterizing and adjusting for each victim-aggressor pair.

While the general concept of crosstalk cancellation is known in the conventional art, conventional crosstalk cancellation is typically not applicable to high-speed environments, such as channels supporting multi-gigabaud rates. Conventional crosstalk cancellation is typically implemented in an entirely digital environment, wherein the accessible aggressing data signals and received victim signals are digitized, and a microprocessor implements the cancellation processes. The analog-to-digital converters and microprocessors needed to implement this digital crosstalk cancellation in a high-speed environment are usually excessively complex, resulting in unacceptable power consumption and product cost.

To address these representative deficiencies in the art, what is needed is a capability for crosstalk cancellation compatible with high-speed environments but with low power consumption and reasonable production cost. A capability is further needed for automatically calibrating or configuring crosstalk cancellation devices. Such capabilities would facilitate higher data rates and improve bandwidth in diverse communication applications.

SUMMARY OF THE INVENTION

The present invention supports compensating for signal interference, such as crosstalk, occurring between two or more communication channels. Compensating for crosstalk can improve signal quality and enhance communication bandwidth or information carrying capability.

A communication signal transmitted on one communication channel can couple an unwanted signal, such as crosstalk, into another communication channel and interfere with communication signals transmitting on that channel. In addition to occurring between two channels, this crosstalk effect can couple between and among multiple communication channels with each channel imposing crosstalk on two or more channels and receiving crosstalk from two or more channels. A channel can be a medium, such as an electrical conductor or an optical fiber that provides a signal path. A single optical fiber or wire can provide a transmission medium for two or more channels, each communicating digital or analog information. Alternatively, each channel can have a dedicated transmission medium. For example, a circuit board can have multiple conductors in the form of circuit traces in which each trace provides a dedicated communication channel.

In another aspect of the present invention, a crosstalk cancellation device can input a crosstalk cancellation signal into a channel receiving crosstalk interference to cancel or otherwise compensate for the received crosstalk. The crosstalk cancellation signal can be derived or produced from a signal that is propagating on another channel, generating the crosstalk. The crosstalk cancellation device can be coupled between the channel that generates the crosstalk and the channel that receives the crosstalk. In this configuration, the crosstalk cancellation device can sample or receive a portion of the signal that is causing the crosstalk and can compose the crosstalk cancellation signal for application to the channel that is receiving the unwanted crosstalk. In other words, the crosstalk cancellation device can tap into the channel that is causing the crosstalk, generate a crosstalk cancellation signal, and apply the crosstalk cancellation signal to the channel receiving crosstalk interference to provide crosstalk cancellation or correction.

In another aspect of the present invention, the crosstalk cancellation device can generate the crosstalk cancellation signal via a model of the crosstalk effect. The model can generate the crosstalk cancellation signal in the form of a signal that estimates, approximates, emulates, or resembles the crosstalk signal. The crosstalk cancellation signal can have a waveform or shape that matches the actual crosstalk signal. A setting or adjustment that adjusts the model, such as a set of modeling parameters, can define characteristics of this waveform.

The crosstalk cancellation signal can be synchronized with the actual crosstalk signal. That is, the timing of the crosstalk cancellation signal can be adjusted to match the timing of the actual crosstalk signal. A timing delay or other timing parameter can define the relative timing or temporal correspondence between the crosstalk cancellation signal and the actual crosstalk signal.

In another aspect of the present invention, the crosstalk cancellation device can implement modeling and timing adjustments so the crosstalk cancellation signal closely matches the actual crosstalk, thereby yielding effective crosstalk cancellation. A controller of the crosstalk cancellation device can monitor and analyze the output of the crosstalk cancellation device. That is, a controller can process the crosstalk-cancelled signal, which is an improved communication signal that results from applying the crosstalk cancellation signal to the channel having crosstalk interference. The controller can vary the modeling parameters and the timing delay, individually or in unison, to minimize any residual crosstalk remaining after crosstalk cancellation. Adjusting the operations of the crosstalk cancellation device can compensate for fluctuating conditions and variations in the crosstalk effect.

In another aspect of the present invention, a crosstalk cancellation device can undergo a calibration or setup procedure that is initiated internally or externally. The crosstalk cancellation device, or another device executing the calibration procedure, can initiate the transmission of a known or predetermined test signal on a communication channel. A test signal can be transmitted on the channel that causes crosstalk or the channel that receives crosstalk interference. Also, one test signal can be transmitted on a channel generating crosstalk, while a different test signal is transmitted on a channel that receives the generated crosstalk interference. For example, a randomized communication signal can propagate on the crosstalk-generating channel, while the crosstalk-receiving channel can have a uniform voltage or current signal that is representative of essentially no data transmission. The crosstalk cancellation device can utilize these known conditions to define the timing and shape of a crosstalk cancellation signal that effectively compensates for crosstalk interference. In other words, the crosstalk cancellation device can define or refine its model of the crosstalk effect based on operating the crosstalk cancellation device with test signals transmitting on the crosstalk-generating and the crosstalk-receiving communication channels.

The discussion of correcting crosstalk presented in this summary is for illustrative purposes only. Various aspects of the present invention may be more clearly understood and appreciated from a review of the following detailed description of the disclosed embodiments and by reference to the drawings and claims.

DETAILED DESCRIPTION OF EXEMPLARY EMBODIMENTS

The present invention supports canceling crosstalk on one or more communication paths in a communication system, such as a high-speed digital data communication system. A flexible and adaptable model of the crosstalk effect can output a cancellation signal that accurately represents crosstalk interference. Coupling this cancellation signal onto a signal path that has crosstalk can cancel such crosstalk and thereby negate the impairment that crosstalk can impose on bandwidth.

Turning now to discuss each of the drawings presented in FIGS. 1-12B, in which like numerals indicate like elements throughout the several figures, an exemplary embodiment of the present invention will be described in detail.

Figure 1:
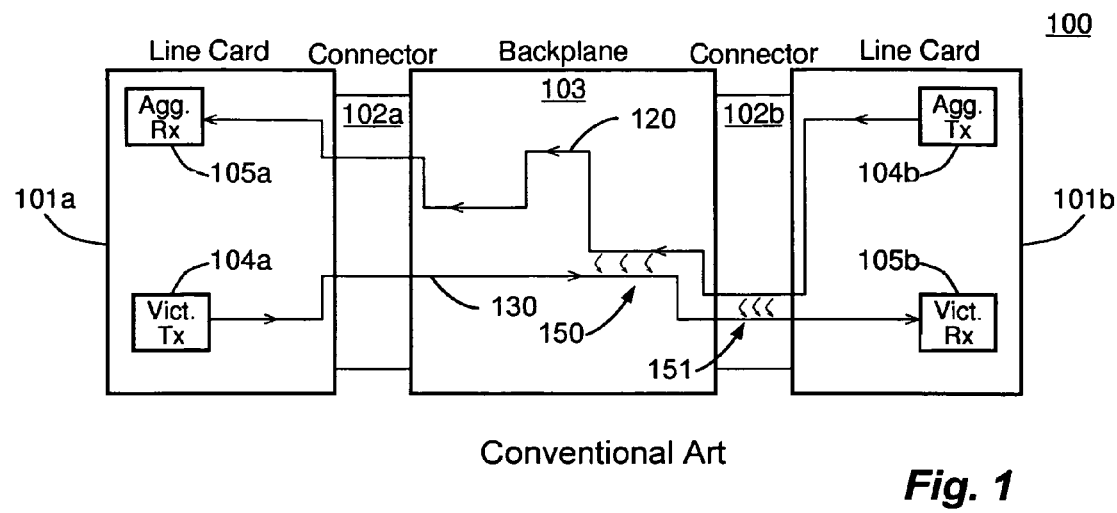
FIG. 1 illustrates a functional block diagram of a communication system having two linecards communicating over a backplane and incurring crosstalk.

Turning now to FIG. 1, this figure illustrates a functional block diagram of a communication system 100 having two linecards 101a, 101b communicating over backplane signal paths 120, 130 exhibiting crosstalk 150, 151. More specifically, FIG. 1 illustrates an occurrence of backplane crosstalk 150, and connector crosstalk 151 in the exemplary case of a backplane communications system 100.

A linecard 101a, 101b is a module, typically a circuit board that slides in and out of a chassis slot and provides communication capabilities associated with a communication channel. A backplane 103 is a set of signal paths, such as circuit traces, at the rear of such a chassis that transmit signals between each installed linecard 101a, 101b and another communication device, such as another linecard 101a, 101b or a data processing component in a rack-mounted digital communication system.

Each linecard 101a, 101b in the system 100 illustrated in FIG. 1 transmits and receives multiple channels of data, such as the two illustrated channels 120, 130. An exemplary channel 130: (i) starts at a transmitter (Tx) 104a on a linecard 101a; (ii) transmits off the linecard 101a through a connector 102a to the backplane 103; (iii) continues across the backplane 103 to another connector 102b and linecard 101b; and (iv) is received by a receiver (Rx) 105b. FIG. 1 shows two such channels labeled the "victim" or "vict." (from victim transmitter 104a to victim receiver 105b) and the "aggressor" or "agg." (from aggressor transmitter 104b to aggressor receiver 105a).

When the signal paths 120, 130 are in close proximity to one another, signal energy radiates from the aggressor channel 120 and is incorporated into the victim channel 130. That is, in areas of the backplane 103 and connectors 102a, 102b in which a first signal path is located close to a second signal path, a portion of the signal energy propagating in the first signal path can couple into the second signal path and corrupt or impair signals propagating on this second signal path. This crosstalk coupling 150 may occur on a linecard 101a, 101b, in a connector 102a, 102b, on a backplane 103, or any combination thereof, for example.

While not illustrated in FIG. 1, crosstalk can also occur in the reverse direction. Specifically, the "victim" channel 130 often radiates energy which corrupts the "aggressor" channel 120. That is, crosstalk frequently occurs in a bidirectional manner, transferring not only from a first signal path to a second signal path but also from the second signal path to the first signal path. Furthermore, in systems having three or more signal paths coexisting in close proximity to one another (not illustrated), crosstalk can transfer among and between three or more signal paths. That is, a single signal can not only impose crosstalk on two or more other signals, but also receive crosstalk interference from two or more other signals.

Similar to the multi-physical-path case illustrated in FIG. 1 and described above, crosstalk can occur with the aggressor and victim channels propagating on a single transmission medium (e.g. a single cable or trace). In this scenario, each channel can correspond to a particular signal band (e.g. a frequency band in frequency division multiplexing system, a spectral band as in an optical wavelength division multiplexing system, or a temporal window in time-division multiplexing system). In other words, two communication channels, one generating crosstalk, one receiving crosstalk, can coexist in a communication medium such as an optical waveguide or a wire, with each communication channel supporting transmission of a dedicated communication signal.

For clarity of explanation, an exemplary embodiment of the present invention based on crosstalk occurring between two channels, each on a separate physical path, is illustrated in FIG. 1 and described in detail herein. In another exemplary embodiment of the present invention, a method and system cancels crosstalk occurring between channels coexisting on a single communication medium. One skilled in the art should be able to make and use the present invention in an application having two or more channels exhibiting crosstalk on a single communication medium following the detailed description, flow charts, plots, and functional block diagrams included herein.

Figure 2:
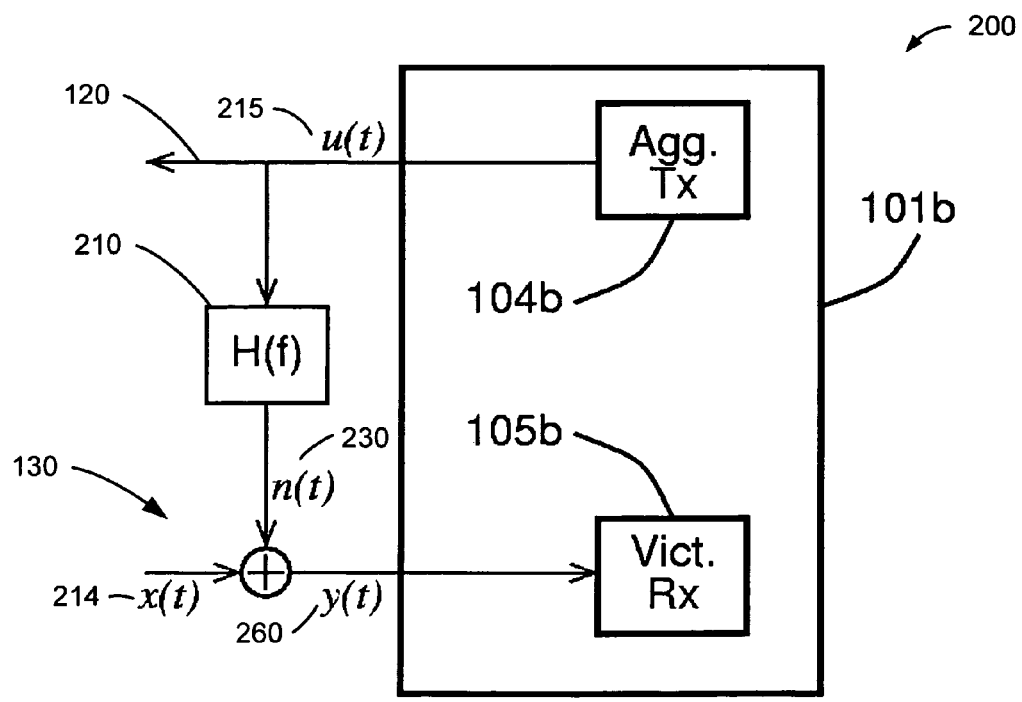
FIG. 2 illustrates a functional block diagram of a crosstalk model for the system illustrated in FIG. 1.

Turning now to FIG. 2, this figure illustrates a functional block diagram 200 of a crosstalk model 210 for the system 100 illustrated in FIG. 1. More specifically, FIG. 2 illustrates a model 210 of the crosstalk effect 151 in the connector 102b based on a single, exemplary transfer function 210.

The aggressor transmitter 104b outputs an aggressor communication signal u(t) 215 on the aggressor channel 120. Energy from this aggressor communication signal u(t) 215 couples into the victim channel 130 via crosstalk 151 in the connector 102b. The aggressor communication signal u(t) 215 is composed of a spread of frequencies. Since crosstalk 151 is a frequency dependent phenomenon, the frequencies of the aggressor communication signal u(t) 215 couple into the victim channel at varying efficiency. The frequency model H(f) 210 of the crosstalk effect 151 expresses the extent to which each of these frequency components couples into the victim channel 130 in the form of a signal n(t) 230. This crosstalk signal n(t) 230 combines with the unadulterated communication signal x(t) 214 propagating on the victim channel 130 from the victim transmitter 104a. The victim channel 130 transmits the resulting combined signal y(t) 260 to the victim receiver 105b.

The crosstalk transfer function 210 can be characterized by the frequency response H(f) 210 (or its time-domain equivalent impulse response h(t)). As depicted in FIG. 2, the response H(f) 210 conveys the transformation that the aggressor data signal u(t) 215 experiences in the connector portion of its route from the aggressing transmitter 104b to the victim receiver 105b. The specifics of this response 210 usually vary among particular victim-aggressor channel pairs. Nevertheless, the general nature of the response is based on geometric constraints and underlying physics. For example, a backplane connector's crosstalk response 151 can depend upon physical system parameters. The backplane crosstalk 150 can also be modeled with a transfer function, and the backplane and connector crosstalks 150, 151 can even be captured with a single (albeit different) transfer function.

An exemplary, non-limiting embodiment of the present invention, in which a crosstalk cancellation device compensates for crosstalk occurring on a linecard-to-backplane connection will be described below with reference to FIGS. 3-12B. The embodiments disclosed herein are provided so that this disclosure will be thorough and complete and will convey the scope of the invention to those having ordinary skill in the art. Those skilled in the art will appreciate that the present invention can be applied to address crosstalk occurring on a backplane or other locations in a communication system and that the present invention can compensate for various forms of crosstalk.

Figure 3:
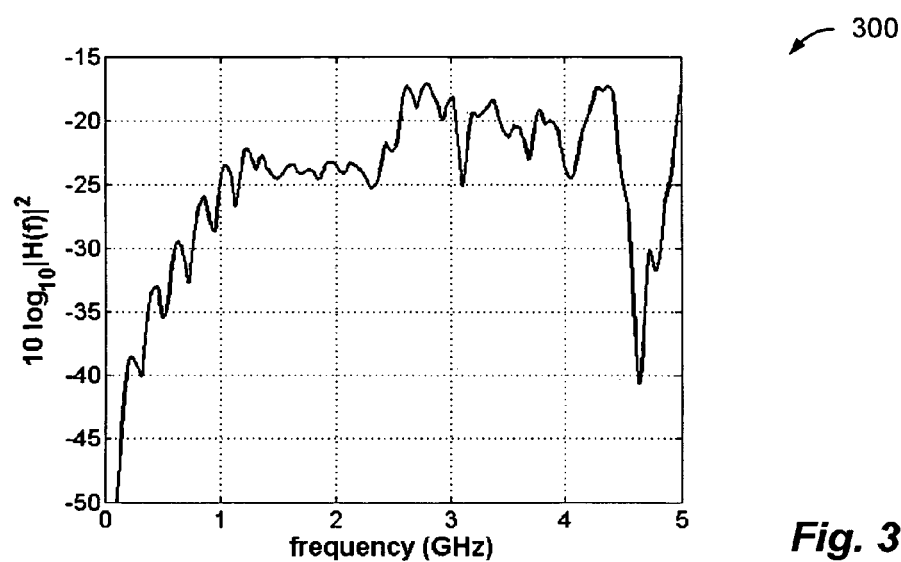
FIG. 3 illustrates a plot of a crosstalk response for a backplane-to-linecard connector according to an exemplary embodiment of the present invention.

Turning now to FIG. 3, this figure illustrates a plot 300 of a crosstalk response 210 for a backplane-to-linecard connector 102b according to an exemplary embodiment of the present invention. This plot 300 illustrates laboratory measurements of the power in the crosstalk signal 151, more specifically the power transferred from the aggressor channel 120 to the victim channel 130 in the connector 102b, as a function of frequency. The horizontal axis is frequency measured in units of gigahertz (GHz). The vertical axis describes signal power in decibels ("dB"), more specifically ten times the base-ten logarithm of the crosstalk frequency response 210 squared. Thus, this plot 300 illustrates the level of crosstalk power transferred from one channel 120 to another channel 130 for each frequency component of the aggressor signal u(t) 215.

In connectors 102a, 102b, the dominant mechanism for crosstalk 151 is typically capacitive coupling between the connector's pins. This mechanism is clearly evident in FIG. 3 as the general high-pass nature of the response of the plot 300. In other words, the plot 300 shows a trend of higher signal frequencies, above about 1 GHz, transferring energy via crosstalk mechanisms 151 more readily than lower frequencies, below 1 GHz. The left side of the plot 300, less than approximately 1 GHz, exhibits an attenuated crosstalk signal having a power less than approximately −25 dB. Thus, this plot 300 shows that the frequency components less than approximately 1 GHz of a communication signal u(t) 215 transfer a relatively small portion of their carried power to a victim channel 130 via connector crosstalk 151. The magnitude of crosstalk 151 increases between approximately 0.25 GHz and 1 GHz. Thus, based on this plot 300, the components of a victim communication signal x(t) 214 that have frequencies between approximately 1 GHz and 4.25 GHz are particularly prone to crosstalk effects 151 from an aggressor communication signal u(t) 215 with similar signal frequencies.

Furthermore, the fluctuations in the frequency response plot 300 at frequencies above 2 GHz illustrate that the crosstalk effect 151 is heavily influenced by other effects than simple capacitive coupling between a pair of pins. In other words, above 2 GHz, the plot 300 deviates from a classical capacitive coupling response, which typically asymptotically (and monotonically) increases with increased frequency. In contrast, the illustrated plot 300 exhibits a pattern of peaks and valleys at higher frequencies, such as a local minimum at approximately 4.6 GHz.

As described above, adequate crosstalk cancellation depends heavily on accurately modeling a system's crosstalk response. Crosstalk cancellation performance is particularly dependent upon model accuracy for frequencies in which the crosstalk effect is strong, namely for frequencies above approximately 1 GHz.

The higher order effects of the aforementioned peaks and valleys in the plot 300 are highly dependent on specific relative geometric relations between the victim signal path 130 and aggressor signal path 120 which are not known a priori, in general. In other words, deriving an accurate and sufficient crosstalk model based on geometric or physical analysis of communication paths can be problematic without empirical data or test measurements regarding actual crosstalk impact on a signal.

Stated another way, the plot 300 of FIG. 3 illustrates that the higher frequency components of a communication signal 214, 215 are particularly prone to crosstalk 151 and that modeling the crosstalk response 210 for these higher frequency components involves addressing the inherently erratic nature of this high frequency response. Since an accurate model of a system's crosstalk response 210 can provide the basis for adequate crosstalk cancellation, such a model needs to accurately represent these higher-order, erratic response characteristics. While passive circuit analysis does not readily derive a model with requisite accuracy, actual signal responses can serve as a basis for constructing an appropriate model.

In one exemplary embodiment of the present invention, a crosstalk model in a crosstalk cancellation device can be defined based on crosstalk measurement data such as the measurement data presented in the plot 300 illustrated in FIG. 3. As an alternative to acquiring such measurement data in the laboratory, the data can be acquired during field operations, for example by switching a crosstalk cancellation device into a calibration mode as will be discussed below in reference to FIG. 9 and FIG. 11.

Figure 4:
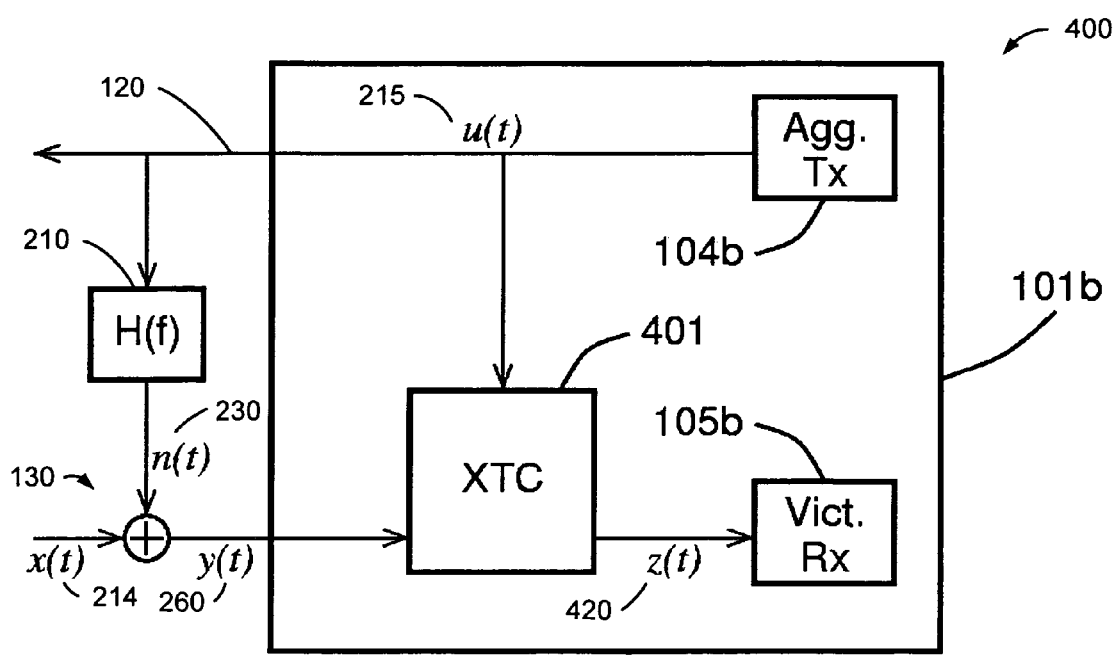
FIG. 4 illustrates a functional block diagram of a crosstalk cancellation system according to an exemplary embodiment of the present invention.

Turning now to FIG. 4, this figure illustrates a functional block diagram of a crosstalk cancellation system 400 according to an exemplary embodiment of the present invention. As described above, the present invention can provide crosstalk cancellation in high-speed digital communication systems, such as the communication system 100 illustrated in FIGS. 1 and 2 and discussed above. More specifically, FIG. 4 illustrates a crosstalk cancellation device or crosstalk canceller ("XTC") 401 arranged to cancel crosstalk 151 occurring in a backplane-to-line card connector 101b as discussed above with reference to FIGS. 1, 2, 3, and 4.

Digital data x(t) 214 propagates in the victim channel 130 for reception by the victim receiver 105b. The victim channel 130 also carries the unwanted crosstalk signal n(t) 230 that is derived from digital data u(t) 215 output by the aggressor transmitter 104b and that is not intended for reception at the victim receiver 105b. The intended data stream signal x(t) 214 and the crosstalk signal n(t) 230 additively form the composite signal y(t) 260. The crosstalk canceller 401 receives the composite signal y(t) 260, corrects the crosstalk interference n(t) 230 from this signal 260 via cancellation and outputs a corrected signal, z(t) 420 for receipt by the victim receiver 105b. That is, the crosstalk canceller 401 applies an estimate of the actual crosstalk 230 to the signals 260 propagating in the victim channel 130 to effectively cancel the crosstalk signal elements 230 while leaving the desired data signal 214 essentially intact.

The steps that the crosstalk canceller 401 performs include:
(i) accepting as separate inputs y(t) 260 (the victim signal corrupted by crosstalk 151) and a representative portion of u(t) 215 (the aggressor signal propagating on the aggressor channel 120 giving rise to the crosstalk signal 230),
(ii) transforming the transmitted aggressor signal u(t) 215 into crosstalk estimates that emulate the signal transformation 210 that actual occurs in the system 200 via the crosstalk effect 151;
(iii) subtracting the modeled crosstalk from the victim y(t) 260 to cancel its crosstalk signal n(t) 230 component; and
(iv) outputting the compensated signal z(t) 420 to the victim receiver 105b, which can be a conventional receiver without specific technology for crosstalk compensation.

Figure 5:
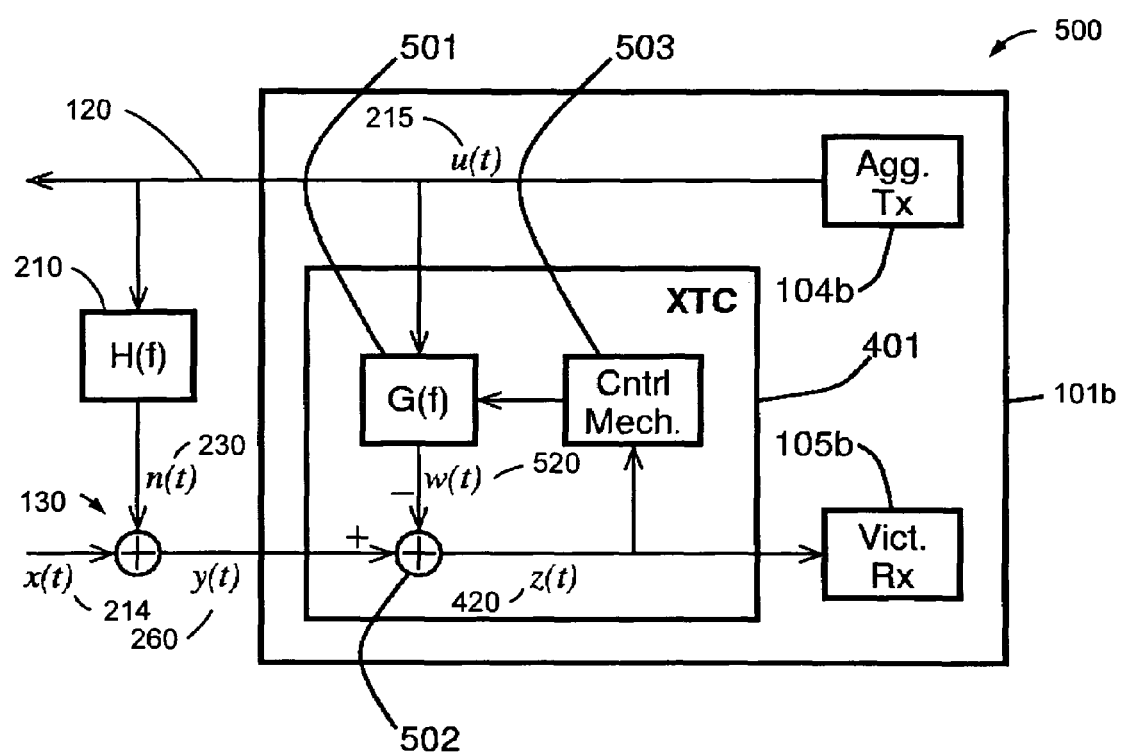
FIG. 5 illustrates a functional block diagram of a crosstalk cancellation system including functional blocks of a crosstalk cancellation device according to an exemplary embodiment of the present invention.

Turning now to FIG. 5, this figure illustrates a functional block diagram of a crosstalk cancellation system 500 according to an exemplary embodiment of the present invention. More specifically, FIG. 5 illustrates an architectural overview of an exemplary crosstalk canceller 401 that has three functional elements 501, 502, 503, a crosstalk model 501, a summation node 502, and a 503 controller, electronic control "mechanism", or control module. The model 501 generates a crosstalk estimate signal w(t) 520, while the summation node 502 applies this crosstalk estimate 520 to the victim channel 130. The controller 503 adjusts parameters in the model 501 based on the output z(t) 420 of the summation node 502.

The model 501 emulates the aggressor transfer function H(f) 210 in the form of an adjustable frequency response function G(f) 501. That is, the model 501 generates an artificial crosstalk signal w(t) 520 that can be a model, simulation, estimate, or emulation of the actual, interfering crosstalk signal n(t) 230 caused by electromagnetic coupling in the connector 102b between the aggressor channel 120 and the victim channel 130. The model frequency response G(f) 501 effectively filters the aggressor data signal u(t) 215 in a manner that applies a frequency dependent response similar to the plot 300 illustrated in FIG. 3 and discussed above.

Because the same aggressor data stream u(t) 215 drives both the actual crosstalk response H(f) 210 and the crosstalk canceller' model 501, the output w(t) 520 of the model 510 is, in the ideal case, equal to the aggressor signal component n(t) 230. That is, G(f) 501 equals H(f) 210 in a theoretical or ideal case in which the environment is noise-free and all system parameters are known and modeled perfectly. Furthermore, in this ideal scenario, the respective output signals n(t) 230 and w(t) 520 of H(f) 210 and G(f) 501 would also be equal to one another. In a real-world situation having numerous unknown influences and indeterminate factors, G(f) 501 approximates H(f) 210 with sufficient precision and accuracy to support essentially error-free communications of high-speed data rates.

The difference node 502 subtracts the emulated aggressor signal w(t) 520, or emulation signal 520, from the composite signal y(t) 260, thus removing or reducing crosstalk interference from the received victim signal y(t) 260. In a physical implementation functioning in a real-world operating environment, the model G(f) 501 does not exactly match the true response H(f) 210. The controller 503 adjusts the model 501 to minimize this error related to inaccuracies between the actual crosstalk effect H(f) 210 and the emulated or modeled crosstalk effect G(f) 501.

Implementation of the summation node 502 is usually straightforward to those skilled in the art. However, special attention should be paid to maintain high sensitivity to the two inputs. It is not uncommon for the incurred, and thus the modeled, crosstalk signals 230, 520 to be small in amplitude, especially at high frequencies. While seemingly negligible at first glance, these high frequencies are often amplified via equalization devices (not illustrated). Thus, while the neglected high-frequency crosstalk may be small before equalization, it can be very significant after equalization. The summation node should be implemented to accommodate such high-frequency response.

A portion of the compensated signal z(t) 420 (i.e. the output of the difference node 502) is tapped off and fed to the controller 503, providing the controller 503 with essentially the same signal 420 that the victim receiver 105b receives. The controller adjusts the parameters of the modeling filter 501, characterized by the response G(f) 501, to maximize the goodness-of-fit to the actual response H(f) 210. In particular, the controller 503 takes as input the crosstalk compensated signal z(t) 420 and processes, monitors, or analyzes that signal 420 to determine signal fidelity. In other words, the controller 503 evaluates the model's performance by analyzing the extent to which the model's output 520 has cancelled the crosstalk signal 230. The controller 503 also adjusts the model 501 to enhance crosstalk cancellation and to provide dynamic response to changing conditions.

Because the output of the controller 503 includes parameters of the modeling filter 501, the controller can adjust the modeled response G(f) 420. Consequently, the controller 503 can manipulate the modeling filter 501 to maximize the fidelity of the compensated signal 420, i.e. the match between G(f) 420 and H(f) 210, by minimizing crosstalk on z(t) 420. Stated another way, the controller 503 monitors the corrected, crosstalk-cancelled signal z(t) 420 and dynamically adjusts the crosstalk model G(f) 420 to improve the crosstalk cancellation and enhance signal quality. Thus, in one exemplary embodiment of the present invention, a crosstalk cancellation device 401 can include a feedback loop that adapts, self-corrects, or self configures crosstalk cancellation to compensate for modeling errors, fluctuating dynamic conditions, and other effects.

The system illustrated in FIG. 5 can be implemented primarily using analog integrated circuitry to provide a relatively low degree of complexity, power consumption, and cost. In one embodiment, the model 501 and difference node 502 are entirely analog. In another embodiment, certain aspects of the model 501 are implemented digitally to exploit the digital nature of the aggressor data source 104b.

The controller 503 typically includes both analog and digital circuitry. Due to particular aspects of the analog pre-processing in the controller 503, this digital circuitry can operate at a low speed relative to the communication data rate and thus can facilitate practical implementation. In particular, the digital circuitry can operate at speeds that are orders of magnitude less than the channel baud rate. In one exemplary embodiment of the present invention, a digital circuit in the controller 503 operates at least one order of magnitude below the channel baud rate. In one exemplary embodiment of the present invention, a digital circuit in the controller 503 operates at least two orders of magnitude below the channel baud rate. In one exemplary embodiment of the present invention, a digital circuit in the controller 503 operates at least three orders of magnitude below the channel baud rate. Further details exemplary embodiments of the controller 503 and the model 501 that together yield a low-power and low-cost crosstalk cancellation solution are discussed in more detail below.

Figure 6:
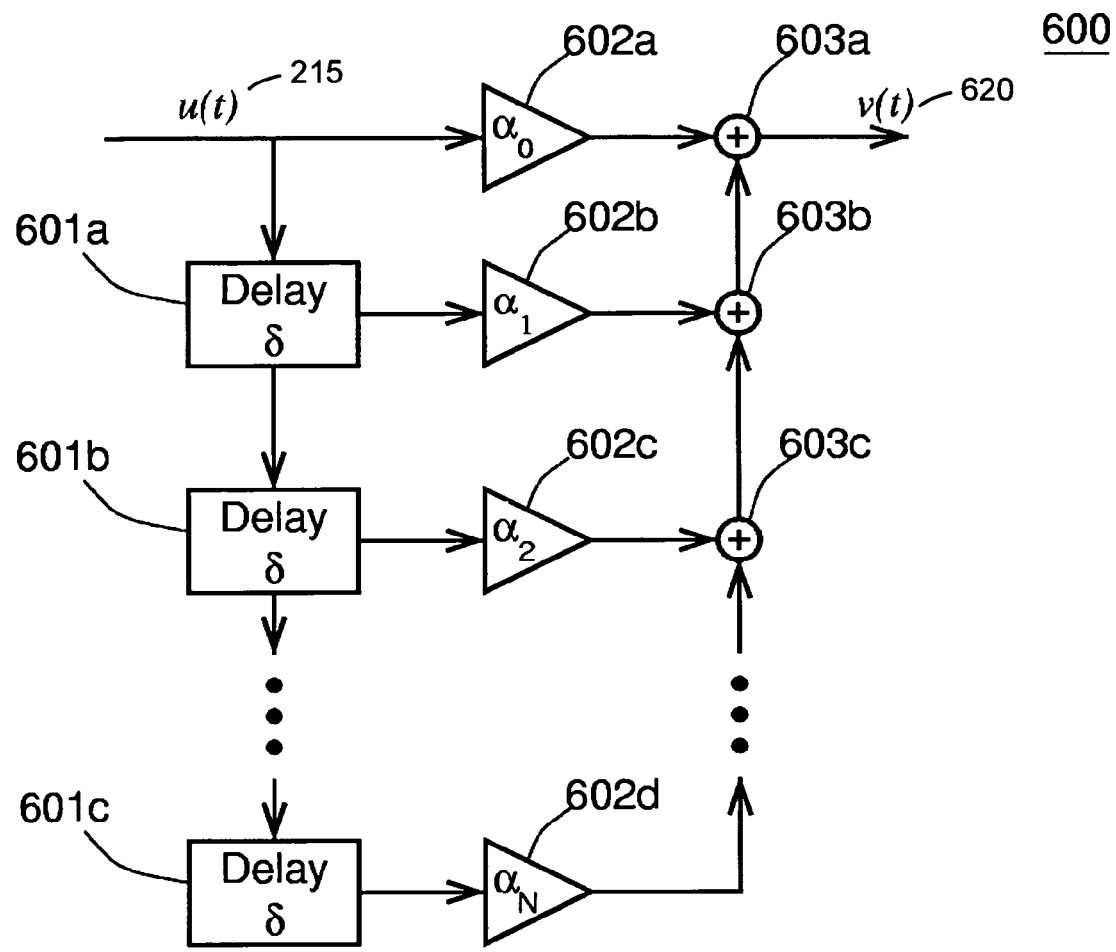
FIG. 6 is a functional block diagram of a tapped delay line filter according to an exemplary embodiment of the present invention.

Turning now to FIG. 6, this figure is a functional block diagram of a tapped delay line filter 600 according to an exemplary embodiment of the present invention. A tapped delay line filter 600 is a device that generates an output signal 620 from an input signal 215 by delaying the input signal 215 through a series of delay stages 601a, 601b, 601c; scaling the output of each delay stage 601a, 601b, 601c, typically with an amplifier 602a, 602b, 602c, 602d; and adding or otherwise combining these scaled outputs. The tapped delay line filter 600 can be an analog component of the model 501 that generates a signal v(t) 620 having a shape or waveform approximating that of the imposed crosstalk signal n(t) 230. That is, the tapped delay line filter 600 can be an exemplary waveform shaper that is implemented via analog components.

As described above, accurately modeling the actual crosstalk response 210 facilitates adequate removal of crosstalk interference 230 via crosstalk cancellation. If a crosstalk cancellation device (not illustrated) were based on an inaccurate crosstalk model (not illustrated) such a device might degrade, rather than improve, signal quality. For example, as a result of an erroneous model, a "correction" signal intended to cancel crosstalk might add interference to a received victim signal while leaving the crosstalk signal that is targeted for cancellation essentially intact. Thus, a crosstalk model, for example based on a filtering mechanism, should have sufficient flexibility to support modeling a variety of crosstalk transfer functions that may be encountered in an application. That is, a flexible crosstalk model is desirable over a rigid model that cannot readily adapt to various applications, operating conditions, and environments, for example.

In one exemplary embodiment of the present invention, as illustrated in FIG. 6, an analog tapped delay line filter 600 (also known as transversal filter) with electrically controllable gain coefficients 602a, 602b, 602c, 602d; models the aggressor crosstalk transfer function 210. This filter 600 can provide a desirable level of flexibility and adaptability that supports a wide range of operating conditions and situations. More specifically, the tapped delay line filter 600 can generate a waveform approximating the waveform of the crosstalk signal 230 imposed on the victim channel 130.

The illustrated filter 600 is an exemplary tapped delay line filter with N delay elements 601a, 601b, 601c (each providing time delay δ (delta)) and corresponding variable coefficient amplifiers 602a, 602b, 602c, 602d with coefficients $\alpha_n$ (alpha$_n$) for n=0, . . . , N. The output v(t) 620 of the tapped delay filter 600 can be written as $$v(t) = \alpha_0 u(t) + \alpha_1 u(t-\delta) + \ldots + \alpha_N u(t-N\delta).$$

Changing the values of the gain coefficients $\alpha_0, \alpha_1, \alpha_2 \ldots \alpha_n$ (alpha$_0$, alpha$_1$, alpha$_2$ ... alpha$_n$) can cause a corresponding change in the response of the filter 600. The tapped delay line filter 600 can model the aggressor's impulse response for up to Nδ (N times delta), that is, up to the temporal span of the filter 600. Additionally, the frequency content of the aggressor response 210 (as illustrated in FIG. 3 and discussed above) can be modeled up to a frequency of f=1/(2δ) (frequency equals the reciprocal of two times delta). Thus, δ(delta) should be chosen such that the highest signal frequency of interest in the victim signal x(t) 214 is less than f=1/(2δ) (frequency equals the reciprocal of two times delta). Furthermore, N should be chosen so that the majority of the aggressor impulse response is contained within a temporal span of Nδ (N times delta). Equivalently, the aggressor frequency response 210 should not exhibit large fluctuations below frequencies of f=1/(Nδ) (frequency equals the reciprocal of N times delta). These conditions for selecting N and δ(delta) contrast with the aggressor signal's conditions. It is not critical if aggressor noise remains above the specified frequency, because a well designed receiver can readily suppress these higher frequencies without degrading victim signal quality.

While a tapped delay line filter 600 can emulate, estimate, or mimic pulse shaping caused by the aggressor response 210, this filter 600 typically cannot adequately address highly variable temporal delay without an unwieldy number of taps or delay stages. Temporal delay is directly associated with the length of the signal path that spans between (i) the circuit tap that directs a portion of the aggressor data signal u(t) 215 to the crosstalk canceller 401 and (ii) the summation node 502 in the crosstalk canceller 401, as illustrated in FIG. 5 and discussed above. More specifically, the modeled temporal delay should closely approximate the temporal delay of the actual crosstalk signal n(t) 230 so that the modeled and actual signals 230, 520 are properly synchronized or timed with respect to one another for effective mutual cancellation. While the output 620 of the tapped delay line filter 600 can be directly used as the output w(t) 520 of the model 501, synchronizing the tapped delay line filter's output 620 with the crosstalk signal 230 on the victim channel 130 can enhance crosstalk cancellation, provide heightened signal fidelity to the victim receiver 105b, and improve overall modeling flexibility.

Because the locations of the coupling points of both the actual crosstalk signal 230 and its modeled counterpart 520 can be significantly variable among victim-aggressor pairs, their respective delays can be ill-defined or subject to uncertainty. Even in the relatively simple case of dominant coupling via the backplane-linecard connector 102b, the signal path length on the linecard 101b is often variable. Thus, the temporal delay can be difficult to predict without specific knowledge and analysis of linecard layout. To address this uncertainty in temporal delay, an adjustable delay 701 can be incorporated into the cross talk modeling filter 501 as illustrated in FIG. 7.

Figure 7:
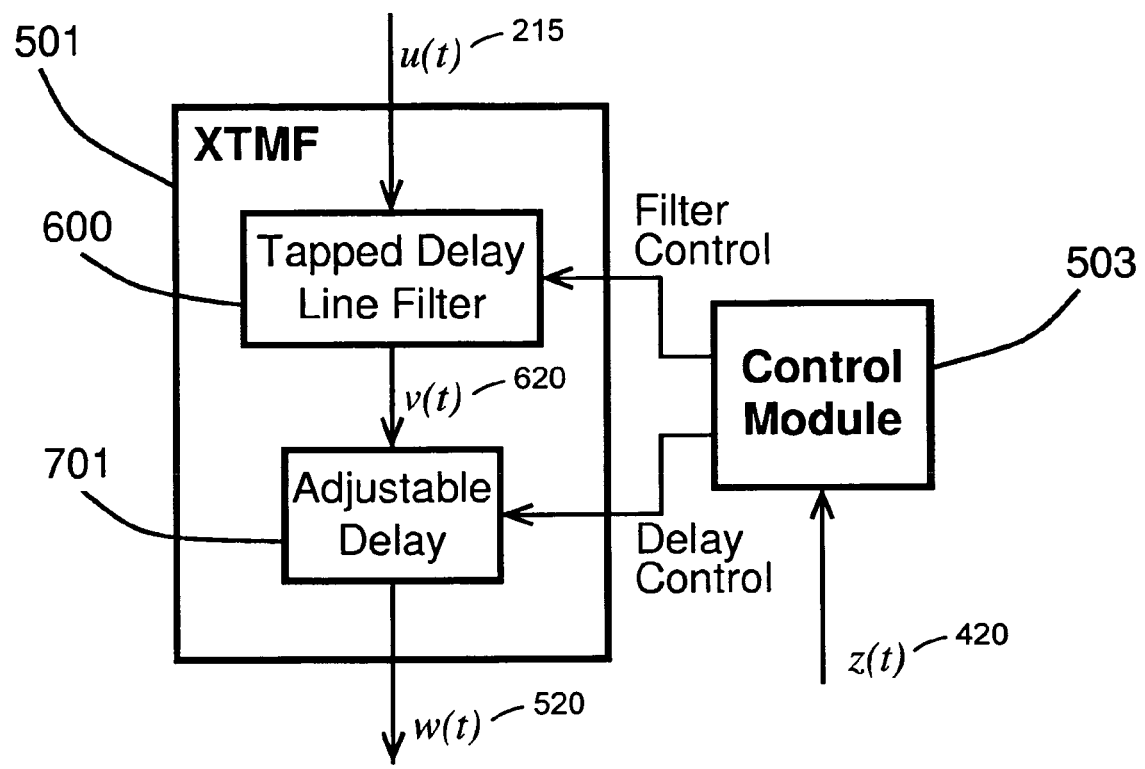
FIG. 7 is a functional block diagram of a crosstalk modeling filter of a crosstalk cancellation device with an adjustable delay according to an exemplary embodiment of the present invention.

Turning now to FIG. 7, this figure is a functional block diagram of a crosstalk modeling filter ("XTMF") 501 of a crosstalk cancellation device 401 with an adjustable delay 701 according to an exemplary embodiment of the present invention. The adjustable delay 701 can either precede or succeed (as shown in FIG. 7) the tapped delay line filter 600. In one exemplary embodiment of the present invention, placing the adjustable delay 701 on the input side of the analog tapped delay line filter 600, rather than the output side as illustrated, can simplify the implementation. This simplification can result from the discrete nature of the digital signal u(t) 215 wherein signal linearity can be readily maintained by quantizing or hard-limiting the output of the delay device 701. Alternatively, if the adjustable delay 701 follows the tapped delay line filter 600, in accord with the illustrated configuration, the signal v(t) 620 is analog at the input to the adjustable delay 701. Inputting an analog signal into the adjustable delay 701 can impose a need for a linear response over a broad range of signal values and frequencies, which can be difficult to achieve for large delay values.

While the tapped delay line filter 600 outputs a correction signal w(t) 520 that approximates the crosstalk signal n(t) 230 undesirably propagating on the victim channel 130 alongside the intended data signal x(t) 214, the adjustable delay 701 synchronizes the waveform of the correction signal 520 with the waveform of the undesirable crosstalk signal 230. That is, the adjustable delay 701 times or coordinates the correction signal 520 so it temporally matches and is synchronized with the actual crosstalk interference 230.

Based on the functions of the tapped delay line filter 600 and the adjustable delay 701, the crosstalk modeling filter 501 outputs a cancellation signal w(t) 520 having form and timing accurately matching the actual crosstalk signal n(t) 230. When inserted into or applied to the victim channel 130 via the subtraction node 502, as illustrated in FIG. 5 and discussed above, the cancellation signal w(t) 520 negates the actual crosstalk signal 230 and thereby enhances the quality of the communication signal z(t) 420 delivered to the victim receiver 105b.

As discussed in further detail above with reference to FIG. 5 and below with reference to FIG. 8, the controller 503 adjusts the tapped delay line filter 600 and the adjustable delay 701 to fine tune their respective performances and to enhance the fidelity of the corrected signal 420 delivered to the victim receiver 105b.

Figure 8:
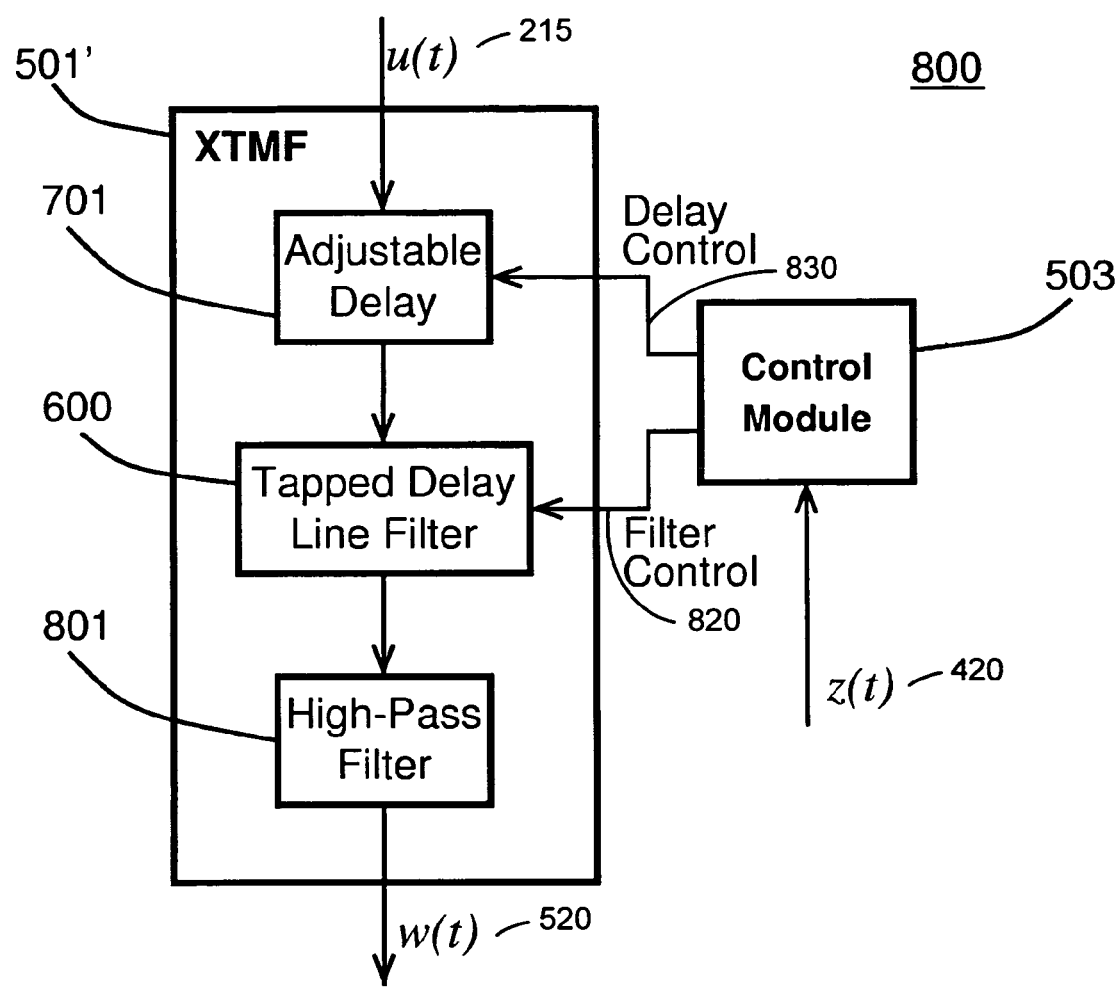
FIG. 8 is a functional block diagram of a crosstalk modeling filter of a crosstalk cancellation device with a high-pass filter according to an exemplary embodiment of the present invention.

Turning now to FIG. 8, this figure is a functional block diagram of a crosstalk modeling filter 501' of a crosstalk cancellation device 800 with a high-pass filter 801 according to an exemplary embodiment of the present invention. The high-pass filter 801 is typically a fixed or non-adjustable filter. In the configuration of the exemplary embodiment of the illustrated in FIG. 8, the adjustable delay 701 feeds the tapped delay line filter 600, thus offering advantages, as discussed above in reference to FIG. 7, for certain applications.

Including the optional high-pass filter 801 in the exemplary crosstalk modeling filter 501', as illustrated in FIG. 7, can enhance performance in some applications or operating environments. A high-pass filter 801 is a device that receives a signal having a range of frequency components attenuates frequency components below a frequency threshold, and transmits frequency components above the frequency threshold.

While tapped delay line filters 600 have a flexible modeling response over the frequency range $$1/(N\delta) < f < 1/(2\delta),$$

they are often less flexible at lower frequencies such as f<1 (Nδ) (frequencies less than the reciprocal of two times delta). Thus, accurately modeling low-frequencies characteristics of the crosstalk response 210 may require a large number N of filter taps that increase filter complexity or may require a longer delay increment δ (delta) that reduces high-frequency flexibility. In many applications, it is preferable to avoid such trade-offs. As discussed above with reference to FIG. 3, for electrical systems, low-frequency crosstalk characteristics are usually dominated by capacitive coupling effects and can consequently be accurately modeled with a high-pass filter such as a simple first-order resistor-capacitor ("RC") high-pass filter. That is, inserting the high-pass filter 801 into the crosstalk modeling filter 801 can provide a high level of performance without requiring a cumbersome or expensive number of tap filters in the tapped delay line filter 600.

Similar to the exemplary embodiment of the crosstalk modeling filter 501 depicted in FIG. 7, the ordering of the tapped delay line filter 600, the adjustable delay 701, and high-pass filter 801 can be permuted to support various arrangements. That is, the present invention supports arranging physical components corresponding to each of the functional blocks 701, 600, 801 illustrated in FIG. 8 in any parallel or series configuration that provides acceptable performance for an intended application. Nevertheless, certain configurations or ordering may provide certain advantages or tradeoffs for select application situations as compared to other configurations.

The exemplary inline configuration illustrated in FIG. 8 places the adjustable delay 701 on the input side of the tapped delay line filter 600 and the high-pass filter 801 on the output side of the tapped delay line filter 600. With this ordering, the implementation of the adjustable delay 701 can be simplified by exploiting the discrete-amplitude nature of both its input and output signal. The tapped delay line filter 600 can also exploit, via digital delay elements, the discrete-amplitude input provided from the adjustable delay 701. In its RC implementation, the high-pass filter 801 is an analog device that does not receive benefit from providing it with a discrete amplitude input. Thus, there is typically no drawback to placing the high-pass filter 801 at the output side of the crosstalk modeling filter 501' or in another position.

As discussed above with reference to FIG. 5, the control module 503 takes as input the crosstalk compensated signal z(t) 420 and outputs control signals 820, 830 to adjust the crosstalk response model 501. The control module's outputs 820, 830 to the crosstalk modeling filter 501 comprises: (i) a "delay control" signal 830 to control the time delay implemented by the adjustable delay component 701; and (ii) a set of "filter control" signals 820 to control the gains on the variable coefficient amplifiers 602a-d in the tapped delay line filter 600. That is, the controller 503 outputs modeling parameters to the tapped delay line filter 600 and timing parameters to the adjustable delay 701.

These output control values are determined based on observation, processing, and/or analysis of the compensated signal z(t) 420. U.S. Nonprovisional patent application Ser. No. 10/108,598, entitled "Method and System for Decoding Multilevel. Signals" and filed on Mar. 28, 2002, discloses a viable exemplary system and method for assessing signal fidelity. Commonly owned U.S. Nonprovisional patent application Ser. No. 10/620,477, entitled "Adaptive Noise Filtering and Equalization for Optimal High Speed Multilevel Signal Decoding" and filed on Jul. 15, 2003, discloses a viable exemplary system and method for controlling device parameters of the crosstalk modeling filter 501. The disclosures of U.S. patent application Ser. No. 10/108,598 and U.S. patent application Ser. No. 10/620,477 are hereby fully incorporated by reference. One or more of the crosstalk model 501, the tapped delay line filter 600, and the adjustable delay 701 can each be controlled and/or adjusted using a method and/or system disclosed in U.S. patent application Ser. No. 10/108,598 or U.S. patent application Ser. No. 10/620,477. The temporal delay adjustment of the adjustable delay 701 can be determined by treating the delay control as a variable that is swept through its entire range of potential values following the disclosure of these patent applications, for example.

Figure 9:
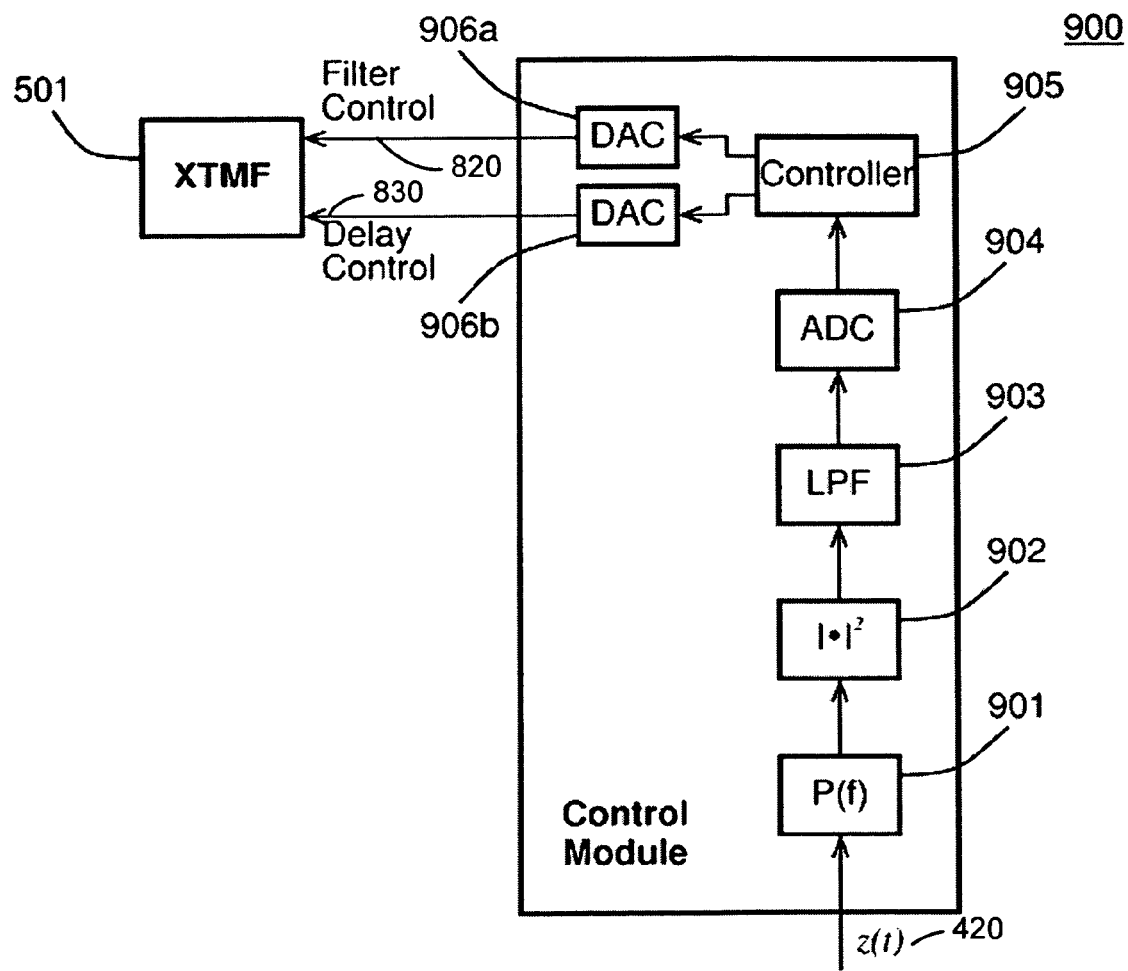
FIG. 9 is a functional block diagram of a control module of a crosstalk cancellation device according to an exemplary embodiment of the present invention.

Turning now to FIG. 9, this figure illustrates an exemplary system 900 for controlling a crosstalk model 501 such as the exemplary crosstalk modeling filter 501' illustrated in FIG. 8 or the exemplary crosstalk modeling filter 501 illustrated in FIG. 7 and their associated adjustable delays 701. More specifically, FIG. 9 is a functional block diagram of a control module 900 of a crosstalk cancellation device 401 according to an exemplary embodiment of the present invention. The exemplary controller 900 illustrated in FIG. 9 facilitates relatively simple theoretical analysis and implementation and, in that regard, can offer benefit to certain application over the control methods and systems disclosed in U.S. patent application Ser. No. 10/620,477 and U.S. patent application Ser. No. 10/108,598 that are discussed above.

The controller 900 of FIG. 9 includes a filter 901, having a frequency transfer response P(f), that receives the crosstalk-cancelled signal z(t) 420 destined for reception by the victim receiver 105*b*. Filter 901 can be a spectral weighting filter based on this frequency transfer response. The output of this filter 901 couples to a power detecting or signal squaring device 902, which provides an output to a low-pass filter 903. A low-pass filter 903 is a device that receives a signal having a range of frequency components, attenuates frequency components above a frequency threshold, and transmits frequency components below the frequency threshold.

An analog-to-digital converter ("ADC") receives the low-pass filter's output and generates a corresponding digital signal which feeds into the digital controller 905. The digital controller 905 in turn generates digital control signals for each of the adjustable delay 701 and the tapped delay line filter 600. Respective digital-to-analog converters ("DACs") 906*a*, 906*b* convert these signals into the analog domain for respective transmission over a delay control line 830 and a filter control line 820. The analog delay control signal adjusts the adjustable delay 701, while the analog filter control signal adjusts the tapped delay line filter 600.

It will be useful to discuss a simple operational example in which crosstalk is imposed on a channel that is in a temporary condition of not carrying data. More specifically, consider a case in which the victim transmitter 104*a* does not transmit any data while the aggressing transmitter 104*b* is sending data with a broad spectral content or range of signal frequencies, such as pseudo-random or coded pseudo-random data. That is, referring briefly back to FIG. 5, the signal x(t) 214 is essentially zero, while u(t) 215 is a digital data signal having broad analog spectral content resulting from randomly varying digital data patterns. In this case, the signal y(t) 260 is simply the incurred aggressor n(t) 230, and the signal w(t) 520 is the modeled aggressor. Thus, the signal z(t) 420 is actually the modeling error of the cancellation device. In the theoretical and ideal situation of perfect crosstalk cancellation, z(t) 420 is zero.

In other words, transmitting an essentially uniform voltage on the victim channel 130 while transmitting signals having a broad range of frequencies on the aggressor channel 120 provides essentially pure crosstalk on the victim channel 130 and n(t) 230 equals y(t) 260. If the crosstalk canceller 401 outputs a cancellation signal w(t) 520 also equaling the pure crosstalk signal n(t) 230, z(t) 420 will have essentially no signal energy. Thus, in this state, signal energy in z(t) 420 is indicative of modeling or delay inaccuracies in the crosstalk modeling filter 501.

The control module 900 can implement this state of transmitting a defined signal on the aggressor channel 120 and transmitting a constant voltage or essentially no data signal on the victim channel 130. The control module 900 can then adjust the adjustable parameters of the crosstalk modeling filter 501' to minimize the signal z(t) 420 received by the victim receiver 105*b*, thereby providing a crosstalk cancellation signal w(t) 520 that matches the actual crosstalk signal n(t) 230 and further providing a modeled crosstalk response G(f) 501 that effectively matches the actual crosstalk response H(f) 210. More generally, the control module 900 cause transmission of defined or known signal patterns on the aggressor channel 120, the victim channel 130, or both the aggressor channel 120 and the victim channel 130 to characterize the crosstalk effect 151 and to control, optimize, or adjust crosstalk cancellation or another form of crosstalk compensation. Further, the control module 900 can have a learning or adaptive mode in the form of a setup mode or a self-configuration procedure and can implement automatic or self calibration.

Referring to FIG. 9 and generalizing beyond the example of imposing crosstalk on a channel void of data, this error signal z(t) 420 can be spectrally weighted with an optional filter 901, whose response is denoted as P(f), to emphasize any higher importance of certain frequencies over others. For example, it may be desired to high-pass filter the error signal z(t) 420 to emulate the effect of equalization in the victim receiver 105*b*. The (potentially spectral weighted) error signal z(t) 420 is then squared or power-detected, i.e. the output of the squaring device 902 is the signal power. The power signal is then passed through a low-pass filter 903 (or integrator) with a relatively low cutoff-frequency to obtain the integrated power, i.e. energy, of the error signal z(t) 420. Thus, the signal at this point corresponds to an analog estimate of the statistical variance (i.e. the square of the standard deviation) of the error signal z(t) 420.

As familiar to those skilled in the art, the error variance is a useful metric for gauging fidelity. Because the cutoff frequency of the low-pass filter 903 is at a very low frequency (typical orders of magnitude below the symbol transmission rate), the variance signal is nearly a constant after the transient effects of any modeling filter changes decay away. Thus, the analog variance signal can be sampled with a simple low-speed high-resolution analog-to-digital converter 904. The digitized signal output by the analog-to-digital converter 904 provides the error variance information to a simple microprocessor, state machine, finite state machine, digital controller, or similar device (referred to herein as a "digital controller") 905. After recording the error-variance for the current set of response modeling parameters, the digital controller 905 may then specify a new filter configuration by digitally outputting the new parameters to a set of DACs 906 which provide the corresponding analog signal to the aggressor emulation module 501.

As the digital controller 905 is able to both (i) set the parameters of the crosstalk modeling filter 501 and (ii) directly observe the effect of the current parameters on the modeling error variance, the digital controller 905 can find a parameter set that maximizes the fit of the aggressor response model 501 to the actual response 210. Because trial-and-error processing is not overly complicated, all combinations of model parameters can be tested in many instances. However, other empirical search/optimization methodologies known to those skilled in the art may be alternatively employed. In one exemplary embodiment of the present invention, a coordinate-descent approach, as described in U.S. patent application Ser. No. 10/620,477, discussed above, provides search and optimization to identify acceptable model parameters.

As discussed above, the control module 900 can comprise a combination of analog and digital circuitry to provide a practical control implementation. Filter 901 and power detecting device 902 collectively input and output a high-speed analog signal. The low-pass filter 903 takes as input a high-speed analog signal and outputs a low-speed analog signal. Filter 901, power detecting device 902, and low-pass filter 903 collectively take a projection of a high-speed signal onto a low-speed signal by extracting the relevant statistical information from the high-speed signal and presenting it in a more concise form. The ADC 904 takes this low-speed analog signal as an input and outputs a corresponding digitized approximation. Consequently, the controller 905 receives and processes this low-speed digital signal. Because the digital signal is low-speed, the associated processing circuitry is less complex than would be required if the signal was high-speed. The digital controller 905 outputs low-speed digital control signals to the digital-to-analog converters 906a, 906b which in turn output low-speed analog signals. As a result of tandem simple high-speed analog preprocessing and low-speed digital processing, the control module 900 provides signal analysis based on a powerful statistical characterization and implements a robust control methodology with relatively little circuit complexity, which are factors that can facilitate practical crosstalk cancellation in high-speed communications systems.

While the illustration in FIG. 9 employs a power-detecting (or signal squaring) device 902 to generate the error-variance, a full-wave-rectifier (which takes the absolute value of the signal) may be used as an alternative. For an implementation based on a full-wave-rectifier, the output of the low-pass filter 903 will now no longer correspond, to error variance, but will nevertheless represent a valid fidelity criterion. In particular, it is the 1-norm of the error signal 420, and thus the fidelity metric still has suitable mathematical properties. Those skilled in the art appreciate that determining the "1-norm" of a signal typically comprises integrating the absolute value of the control signal. This substitution may be advantageous for certain applications because: (i) the 1-norm signal may have a reduced dynamic range (thus relaxing resolution constraints on the analog-to-digital converter 904); and (ii) full-wave-rectifiers may be easier to implement than power-detectors. Such modifications are considered within the scope of the present invention.

Similarly, the power detector 902 may also be replaced with a half-wave-rectifier or any like device that is used to assess signal magnitude. It will also be appreciated by those skilled in the art that the division of the crosstalk canceller 401 into functional blocks, modules, and respective sub-modules as illustrated in FIGS. 5 through 9 are conceptual and do not necessarily indicate hard boundaries of functionality or physical groupings of components. Rather, representation of the exemplary embodiments as illustrations based on functional block diagrams facilitates describing an exemplary embodiment of the present invention. In practice, these modules may be combined, divided, and otherwise repartitioned into other modules without deviating from the scope of the present invention.

In one exemplary embodiment of the present invention, a crosstalk cancellation system is a single integrated circuit ("IC"), such as a monolithic IC. Each of a crosstalk cancellation device, a control module, and a crosstalk modeling filter can also be single ICs. Such ICs can be complementary metal oxide semiconductor ("CMOS") ICs and can be fabricated in a 0.18 micron process, for example.

A process for canceling crosstalk and a process for calibrating a crosstalk canceller will now be described with respective reference to FIG. 10 and FIG. 11. Certain steps in the processes described herein must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 10:
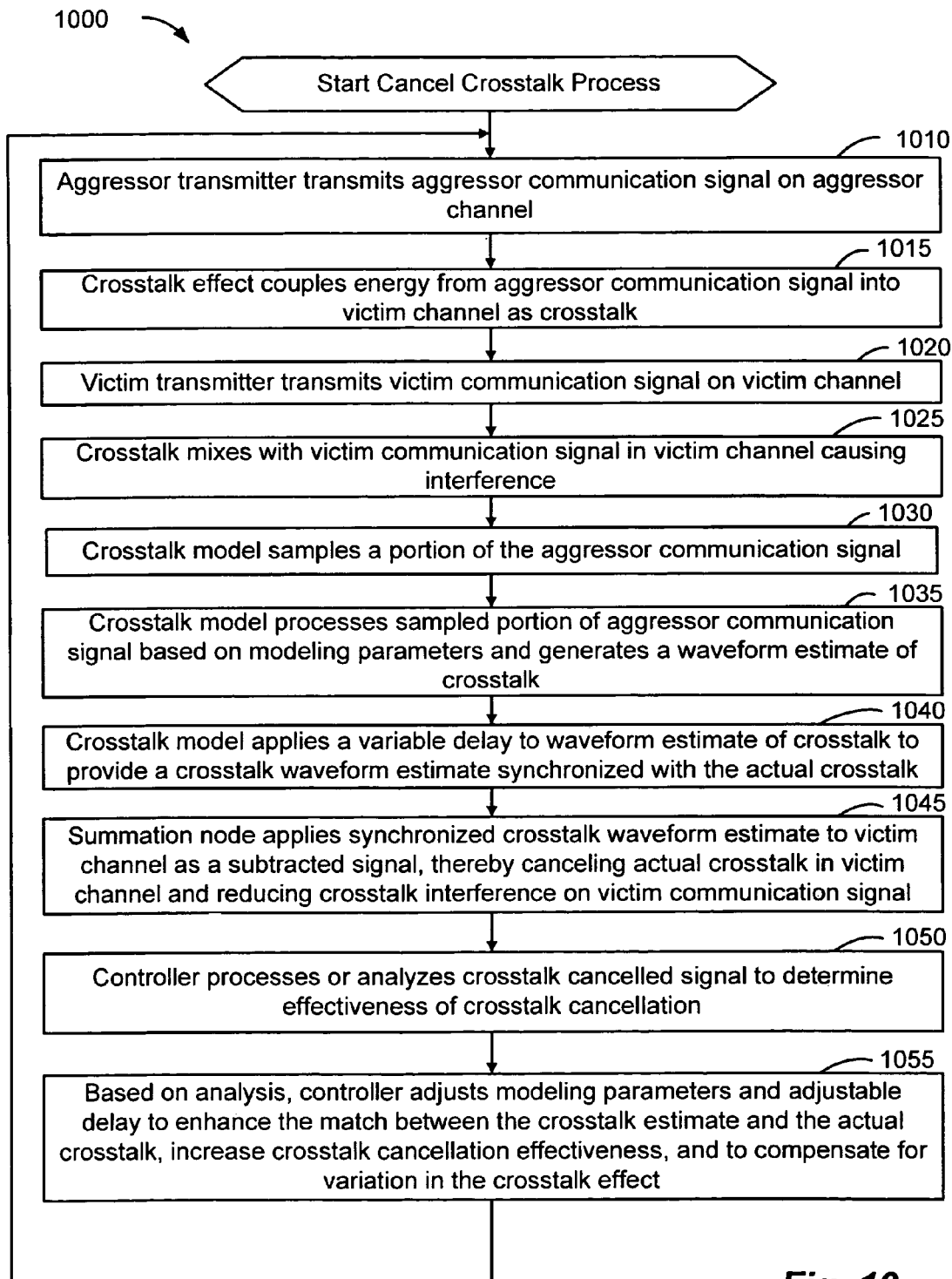
FIG. 10 is a flow chart illustrating a process for canceling crosstalk according to an exemplary embodiment of the present invention.

Turning now to FIG. 10, this figure is a flow chart illustrating Process 1000, entitled Cancel Crosstalk, for canceling crosstalk 151 according to an exemplary embodiment of the present invention. At Step 1010, the first step in Process 1000, the aggressor transmitter 104b transmits an aggressor communication signal u(t) 215 on the aggressor channel 120. This communication signal 215 can be an analog or a digital signal carrying data.

At Step 1015, the crosstalk effect 151 couples energy from the aggressor communication signal u(t) 215 into the victim channel 130 as crosstalk n(t) 230. The coupling mechanism can be electromagnetic coupling, as in the exemplary case of electrical data signals propagating on a backplane 103, or another optical or electrical crosstalk mechanism. The energy transfer of the crosstalk effect 151 generates the crosstalk signal n(t) 215 in the victim channel 130 in a manner that results in signal propagation towards the victim receiver 105b.

At Step 1020, the victim transmitter 104a transmits the victim communication signal x(t) 214 on the victim channel 130. The victim communication signal 214 can be either an analog or a digital signal. At Step 1025, the crosstalk signal n(t) 230 coexists or mixes with the victim communication signal x(t) 214 in the victim channel 130. The composite signal y(t) 260 results from the combination of these signals 214, 230.

At Step 1030, the crosstalk model 501 acquires a sample of the aggressor communication signal u(t) 215. In other words, a tap or other node directs a representative portion of the aggressor communication signal 215 to the crosstalk canceller 401 for reception and processing by the crosstalk model 501.

At Step 1035, the crosstalk model 501 processes the sampled portion of the aggressor communication signal u(t) 215 via the tapped delay line filter 600. Modeling parameters, such as the gain or scaling constants of the tapped delay line filter 600, provide the basis for generating a waveform estimate v(t) 620 of the crosstalk signal n(t) 215. More specifically, the coefficients $\alpha_0, \alpha_1, \alpha_2 \ldots \alpha_n$ (alpha$_0$, alpha$_1$, alpha$_2$ ... alpha$_n$) of the variable coefficient amplifiers 602a, 602b, 602c, 602d in the tapped delay line filter define a waveform v(t) 620 approximating the crosstalk signal 215.

At Step 1040, the adjustable delay 701 in the crosstalk model 501 applies a time delay to the waveform estimate v(t) 620 to synchronize this waveform 620 with the interfering crosstalk signal n(t) 230 propagating in the victim channel 130. At Step 1045, the summation node 502 of the crosstalk canceller 401 applies the resulting crosstalk cancellation signal w(t) 520 to the victim channel 130 and the combined crosstalk and communication signal y(t) 260 propagating therein. The crosstalk cancellation signal w(t) 520 cancels at least a portion of the crosstalk signal component w(t) 520 propagating in the victim channel 130. Reducing this crosstalk interference 520 improves signal fidelity in the communication signal z(t) 420 that is output by the crosstalk canceller 410 for delivery to the victim receiver 105b.

At Step 1050, the controller 503 processes or analyzes the crosstalk compensated signal z(t) 420 to determine effectiveness of crosstalk cancellation. In other words, the controller 503 assesses signal fidelity to determine if the crosstalk canceller is applying a crosstalk cancellation signal w(t) 520 that accurately matches the actual crosstalk n(t) 230, both in waveform and in timing.

At Step 1055, the controller 503 adjusts the modeling parameters, specifically the coefficients of the variable coefficient amplifiers 602a, 602b, 602c, 602d in the tapped delay line filter 600, to optimize the waveform match between the crosstalk cancellation signal w(t) 520 and the actual crosstalk signal n(t) 230. The controller 503 further adjust the variable or adjustable time delay of the adjustable delay 701 to synchronize the crosstalk cancellation signal w(t) 520 with the actual crosstalk signal n(t) 230. That is, the controller 503 adjusts the operation of the crosstalk canceller 401 by implementing parameter adjustments to the crosstalk modeling filter 501 to enhance the fidelity of the net communication signal z(t) 420 delivered to the victim receiver 105b.

Following Step 1055, Process 1000 iterates Steps 1010-1055. The crosstalk canceller 401 continues canceling crosstalk 230 and implementing adaptive responses to dynamic conditions, thereby providing an ongoing high level of communication signal fidelity.

Figure 11:
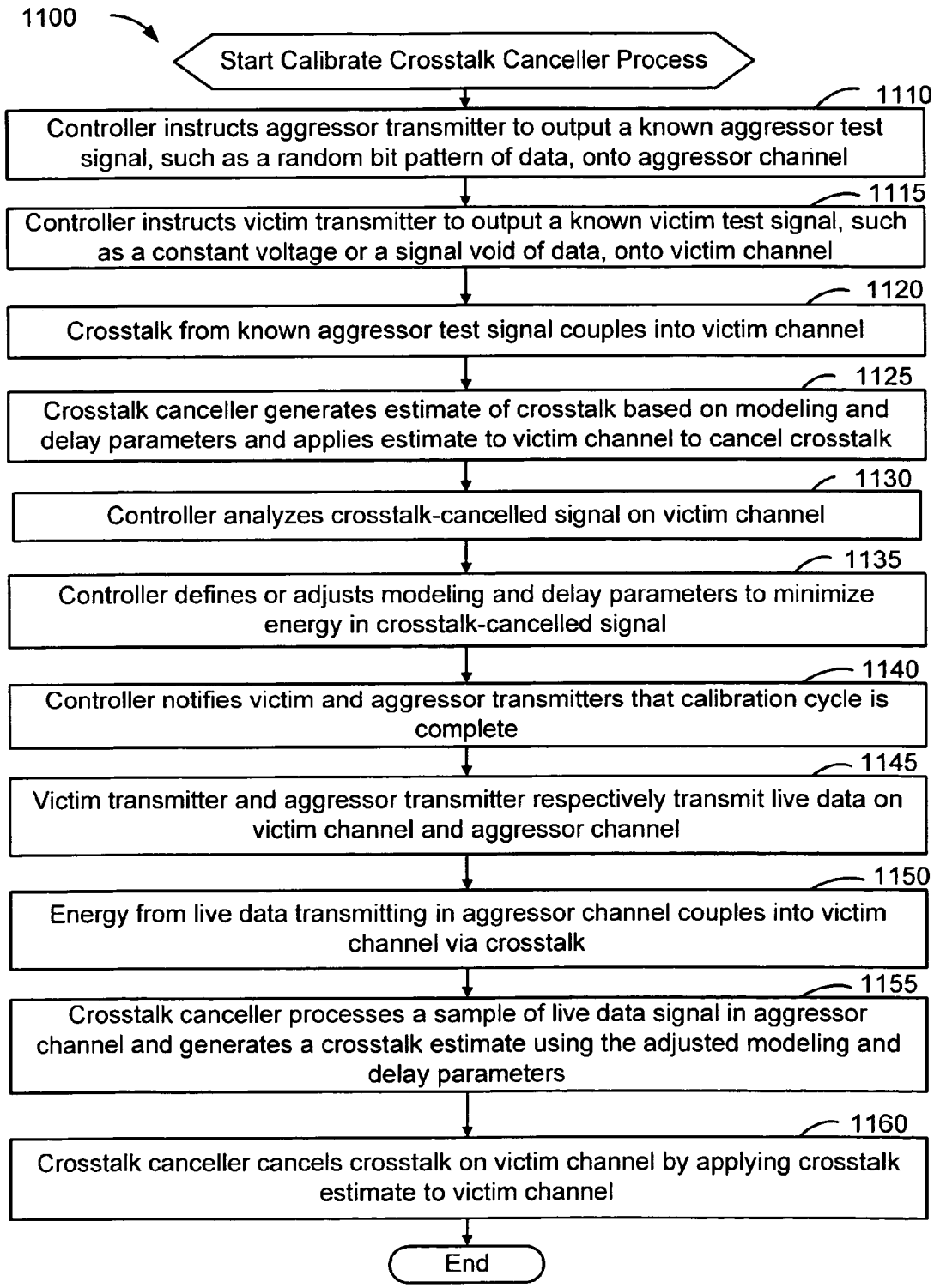
FIG. 11 is a flow chart illustrating a process for calibrating a crosstalk cancellation device according to an exemplary embodiment of the present invention.

Turning now to FIG. 11, this figure is a flow chart illustrating Process 1100, entitled Calibrate Crosstalk Canceller, for calibrating a crosstalk cancellation device 401 according to an exemplary embodiment of the present invention. At Step 1110, the first step in Process 1100, the controller 503 initiates a calibration sequence. The controller 900 instructs the aggressor transmitter 104b to output a signal having a known or defined test pattern, for example a random or pseudo random bit pattern of data, onto the aggressor channel 120. This test or calibration signal can have the format of an aggressor communication signal u(t) 215 or can be uniquely formatted for characterizing the crosstalk response H(f) 210. That is, the controller 900 can control transmission of signals having predetermined voltage patterns on the aggressor channel 120.

At Step 1115, the controller 900 instructs the victim transmitter 104b to output a known victim test or reference signal onto the victim channel 130. The test signal can be a predetermined communication signal or simply a constant voltage, null of data. Sending a known test signal on the victim channel 130 facilitates isolating the crosstalk response H(f) 210 from other effects that may generate signal distortion on the victim channel 130. That is, the controller 900 can control transmission of signals having predetermined voltage patterns on the victim channel 130.

At Step 1120, crosstalk n(t) 230 from the known aggressor signal u(t) 215 couples into the victim channel 130. With the victim channel 130 carrying a constant voltage as the victim signal x(t) 214, the composite communication and crosstalk signal y(t) 260 on the victim channel 130 is essentially the crosstalk signal n(t) 230.

At Step 1125, the crosstalk canceller 401 generates an estimate w(t) 520 of the crosstalk signal n(t) 230 for crosstalk cancellation. The crosstalk canceller 401 generates this estimate 520 using modeling and delay parameters that result in a waveform and timing match between the crosstalk signal n(t) 230 and the crosstalk cancellation signal w(t) 520. The crosstalk compensator 401 applies the crosstalk estimate 520 to the victim channel 130 and cancels at least a portion of the crosstalk 230 propagating thereon. The resulting crosstalk-cancelled signal z(t) 420 propagates to the victim receiver 105b.

At Step 1130, the controller 503 processes and analyzes the crosstalk-cancelled signal z(t) 420 output by the crosstalk canceller 401. Based on the analysis, the controller 503 adjusts the modeling and delay parameters to minimize the energy in the crosstalk cancelled signal z(t) 420. That is, the controller 503 varies the operational parameters of the crosstalk canceller 401 towards reducing the residual crosstalk. This control action matches the crosstalk compensation signal w(t) 520 with the actual crosstalk n(t) 230 imposed on the victim channel 130.

At Step 1140, the controller 503 completes the calibration cycle and provides notification to the aggressor and victim transmitters 104a, 104b that the crosstalk canceller 401 is set to process live data. In response to this notification, at Step 1145 the victim transmitter 104a and the aggressor transmitter 104b each transmit live data on their respective channels 130, 120.

At Step 1150, crosstalk 230 from live data 215 transmitting on the aggressor channel 120 couples into the victim channel 130. At Step 1155, the crosstalk canceller 401 processes a sample of the live data 215 transmitting in the aggressor channel 120 and generates an emulation or estimate 520 of the crosstalk 230 using the modeling and delay parameters defined or updated during calibration.

At Step 1160, the crosstalk canceller 401 applies the crosstalk estimate 520 to the victim channel 130 for crosstalk cancellation and presents the victim receiver 105 with a high-fidelity signal. Process 1100 ends following Step 1160. The controller 503 can repeat the calibration procedure at defined or regular time intervals or when the controller's monitoring capability determines that signal fidelity is impaired or as fallen below a threshold.

Figure 12A:
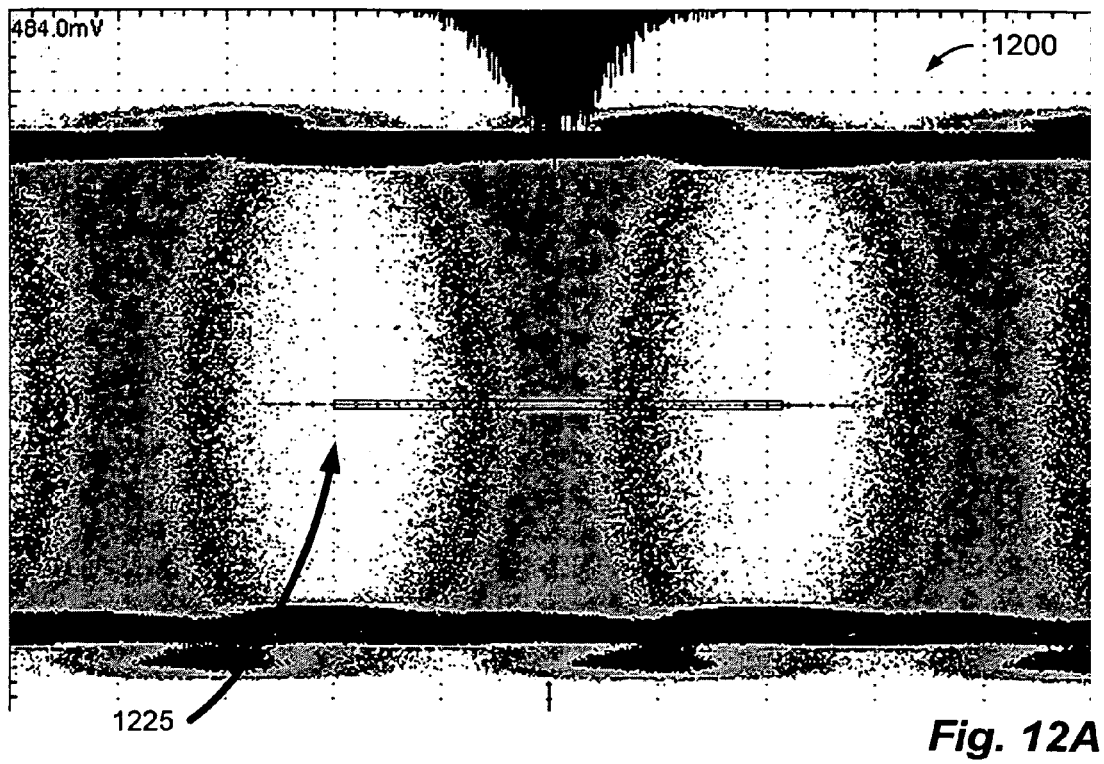
FIGS. 12A and 12B respectively illustrate testing data of a communication system before and after implementing crosstalk cancellation according to an exemplary embodiment of the present invention.
Figure 12B:
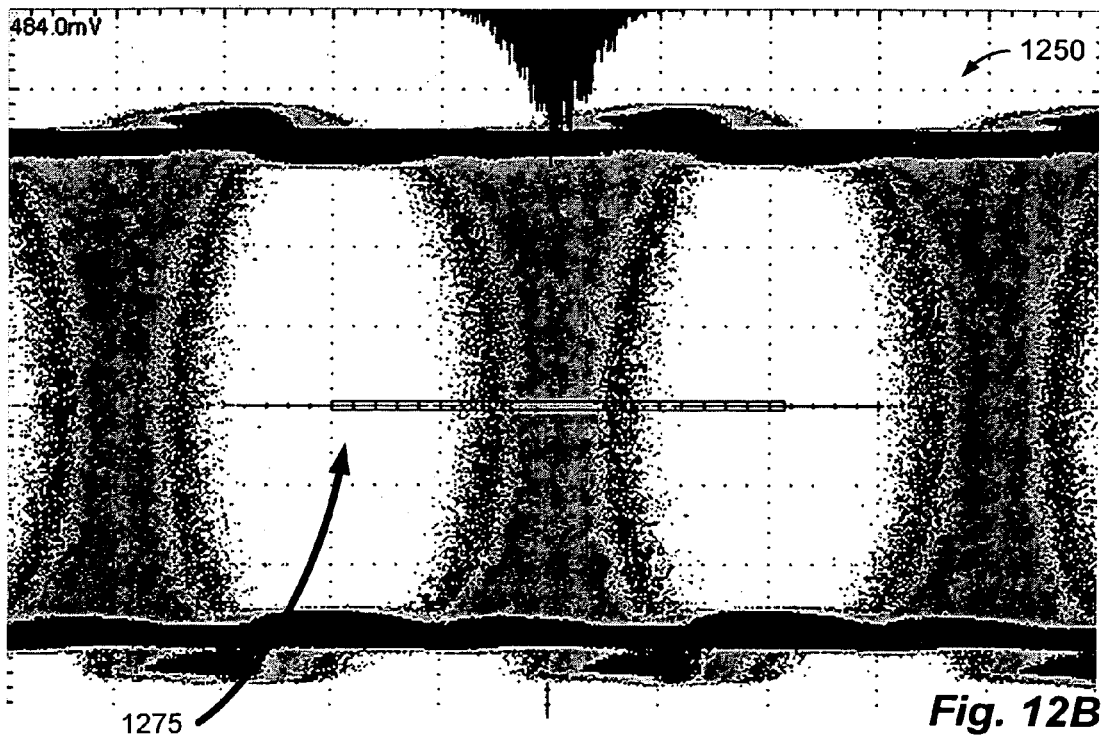

Turning now to FIGS. 12A and 12B, these figures respectively illustrate testing data of a communication system before and after implementing crosstalk cancellation according to an exemplary embodiment of the present invention. These figures present eye diagrams 1200, 1250 of measured data captured under laboratory conditions. As is well known to those skilled in the art, eye diagrams 1200, 1250 provide a visual indication of signal quality. The level of openness of an "eye" 1225, 1275 in an eye diagram 1200, 1250 correlates with the level of signal quality. That is, a noisy, distorted, or closed eye in an eye diagram typically indicates signal impairment.

FIG. 12A is an eye diagram 1200 from a 5 Gigabits per second binary communication system operating under laboratory conditions believed to be representative of field conditions. The victim signal 130 has an amplitude of 800 millivolts, while the aggressor signal 120 has an amplitude of 1,200 millivolts. FIG. 12A illustrates the eye diagram 1200 of the received signal 260 after equalization and limiting amplification but without crosstalk compensation. FIG. 12B illustrates the eye diagram 1250 of the received signal 420 after application of crosstalk cancellation in accordance with an exemplary embodiment of the present invention followed by equalization and limiting amplification. As with the eye diagram of FIG. 12A, the victim signal 130 has an amplitude of 800 millivolts, while the aggressor signal 120 has an amplitude of 1,200 millivolts.

Because the signal path includes a limiting amplifier in both the crosstalk-corrected eye diagram 1250 and the eye diagram 1200 without crosstalk compensation, the thicknesses of the horizontal "eye-lids" at the top and bottom of each eye diagram 1200, 1250 do not provide a useful gauge of signal quality. Rather the signal performance enhancement provided by crosstalk cancellation is evident from the wide open eye 1275 in the crosstalk-corrected eye diagram 1250 relative to the narrow, noisy eye 1225 of the eye diagram 1225 without crosstalk correction.

To further characterize communication performance improvement achieved by crosstalk cancellation in accordance with an exemplary embodiment of the present invention, bit error rate measurements were acquired from this test system under the same test conditions, before and after crosstalk cancellation. Without crosstalk cancellation, the communication system exhibited an average of one bit error for every 100,000 bits transmitted. With crosstalk cancellation, the communication system exhibited an average of one bit error for every 100,000,000,000,000 bits transmitted.

Although a system in accordance with the present invention can comprise, a circuit that cancels, corrects, or compensates for crosstalk imposed on one communication signal by another signal, those skilled in the art will appreciate that the present invention is not limited to this application and that the embodiments described herein are illustrative and not restrictive. Furthermore, it should be understood that various other alternatives to the embodiments of the invention described here may be employed in practicing the invention. The scope of the invention is intended to be limited only by the claims below.

What is claimed is:

1. A method for reducing crosstalk that a first communication signal has imposed on a second communication signal, resulting in a third communication signal comprising the second communication signal and the imposed crosstalk, the method comprising the steps of:
   obtaining a sample of the first communication signal;
   generating an estimate of the imposed crosstalk in response to processing the sample;
   temporally aligning the estimate to the imposed crosstalk; and
   reducing the imposed crosstalk in response to applying the temporally aligned estimate to the third communication signal.

2. The method of claim 1, wherein the temporally aligning step comprises timing the estimate to match the imposed crosstalk, and wherein reducing the imposed crosstalk comprises canceling at least some of the imposed crosstalk.

3. The method of claim 1, wherein temporally aligning the estimate to the imposed crosstalk comprises establishing a predetermined phase relationship between the estimate and the imposed crosstalk.

4. The method of claim 3, wherein the predetermined phase relationship comprises a phase difference of approximately 180 degrees.

5. The method of claim 1, wherein temporally aligning the estimate to the imposed crosstalk comprises providing a phase match between the estimate and the imposed crosstalk.

6. The method of claim 1, wherein applying the temporally aligned estimate to the third communication signal comprises generating a fourth communication signal, and wherein the method further comprises the step of evaluating the reduction of the imposed crosstalk in response to processing the fourth communication signal.

7. The method of claim 1, wherein applying the temporally aligned estimate to the third communication signal comprises generating a fourth communication signal, and
   wherein the method further comprises the steps of:
   analyzing the fourth communication signal; and
   based on the analysis, refining the temporal alignment between the estimate and the imposed crosstalk.

8. The method of claim 1, wherein processing the sample comprises processing the sample based on a parameter, and wherein the method further comprises the step of adjusting the parameter based on an analysis of crosstalk reduction.

9. The method of claim 1, wherein temporally aligning the estimate to the imposed crosstalk comprises delaying the estimate according to a parameter, and wherein the method further comprises the step of adjusting the parameter in response to evaluating the reduced crosstalk.

10. The method of claim 1, further comprising the steps of:
    transmitting a test signal on a first channel, operative to carry the first communication signal;
    coupling test crosstalk onto a second channel, operative to carry the second communication signal, in response to transmitting the test signal on the first channel; and
    setting a parameter of a model in response to analyzing the coupled test crosstalk, wherein processing the sample comprises processing the sample with the model.

11. The method of claim 10, wherein a backplane comprises at least a portion of the first channel and at least a portion of the second channel.

12. The method of claim 1, wherein generating the estimate comprises using an integrated circuit.

13. The method of claim 1, wherein the generating step comprises operating a digital circuit at least one order of magnitude below a channel baud rate.

14. The method of claim 1, further comprising the steps of:
    generating test crosstalk in response to transmitting a test signal on a channel; and
    adjusting a modeling parameter based on analysis of the generated test crosstalk.

15. A method for reducing communication interference, comprising the steps of:
    obtaining a sample of a first communication signal, transmitting on a first communication channel and producing interference on a second communication channel;
    generating an estimate of the produced interference in response to processing the sample according to a parameter;
    reducing the interference on the second channel in response to applying the generated estimate to the second communication channel;
    producing test interference in response to transmitting a test signal on the first communication channel; and
    adjusting the parameter in response to analyzing the produced test interference.

16. The method of claim 15, wherein applying the generated estimate to the second communication channel comprises operating an interference compensation device in a first mode, and wherein the step of producing the test interference comprises operating the interference compensation device in a second mode.

17. The method of claim 15, wherein the parameter comprises a modeling parameter, and wherein adjusting the parameter comprises refining the modeling parameter.

18. The method of claim 15, wherein reducing the interference comprises reducing the interference to a level, and wherein the method further comprises the steps of:
    generating another estimate of the produced interference based on the adjusted parameter; and
    reducing the interference below the level in response to applying the another estimate to the second communication channel.

19. The method of claim 15, wherein generating the estimate comprises using an integrated circuit.

20. The method of claim 15, wherein the generating step comprises operating a digital circuit at least one order of magnitude below a channel baud rate.

\* \* \* \* \*